US012638966B2

(12) United States Patent
He et al.

(10) Patent No.: US 12,638,966 B2
(45) Date of Patent: May 26, 2026

(54) GROUP PROCESSING METHOD AND APPARATUS, DEVICE, MEDIUM, AND PROGRAM PRODUCT

(71) Applicant: TENCENT TECHNOLOGY (SHENZHEN) COMPANY LIMITED, Shenzhen (CN)

(72) Inventors: Biying He, Shenzhen (CN); Yiying Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 275 days.

(21) Appl. No.: 18/588,310

(22) Filed: Feb. 27, 2024

(65) Prior Publication Data

US 2024/0201840 A1 Jun. 20, 2024

Related U.S. Application Data

(63) Continuation of application No. PCT/CN2023/088866, filed on Apr. 18, 2023.

(30) Foreign Application Priority Data

Sep. 20, 2022 (CN) .......................... 202211143770.2

(51) Int. Cl.
*G06F 3/0486* (2013.01)
*G06F 3/0488* (2022.01)
*H04L 12/18* (2006.01)

(52) U.S. Cl.
CPC .......... *G06F 3/0486* (2013.01); *G06F 3/0488* (2013.01); *H04L 12/1822* (2013.01)

(58) Field of Classification Search
CPC ..................................................... G06F 3/0486
(Continued)

(56) References Cited

U.S. PATENT DOCUMENTS

| | | | |
|---|---|---|---|
| 8,903,712 B1* | 12/2014 | Tremblay | G10L 15/1815 |
| | | | 707/706 |
| 8,956,232 B2* | 2/2015 | Sanders | H04L 12/1818 |
| | | | 715/753 |
| 11,023,097 B2* | 6/2021 | Jeong | H04M 1/72436 |

(Continued)

FOREIGN PATENT DOCUMENTS

| | | |
|---|---|---|
| CN | 112583700 A | 3/2021 |
| CN | 112995012 A | 6/2021 |
| CN | 114153344 A | 3/2022 |

OTHER PUBLICATIONS

The World Intellectual Property Organization (WIPO) International Search Report for PCT/CN2023/088866 Jul. 4, 2023 6 Pages (including translation).

*Primary Examiner* — Reza Nabi
(74) *Attorney, Agent, or Firm* — Anova Law Group, PLLC

(57) ABSTRACT

Embodiments of this application provide a group processing method and apparatus, a device, and a medium. The method includes displaying a user interaction page associated with a target object, the user interaction page comprising an interaction object of the target object in a communication application, and the interaction object being displayed in a form of an object identifier on the user interaction page; and creating a target group based on M interaction objects in response to an object combination operation on the user interaction page, and displaying the target group on the user interaction page, M being an integer greater than 1.

19 Claims, 13 Drawing Sheets

(58) Field of Classification Search
USPC ......................................................... 715/753
See application file for complete search history.

(56) References Cited

U.S. PATENT DOCUMENTS

| | | | | | |
|---|---|---|---|---|---|
| 2012/0313858 A1* | 12/2012 | Park | ........................ | G06F 3/018 |
| | | | | 345/171 |
| 2013/0109363 A1* | 5/2013 | Yang | ................ | H04M 1/72403 |
| | | | | 455/414.1 |
| 2014/0006523 A1 | 1/2014 | Hofman et al. | | |
| 2014/0187218 A1* | 7/2014 | Carrelli | .............. | H04L 65/1069 |
| | | | | 455/416 |
| 2014/0189539 A1* | 7/2014 | St. Clair | ........... | G06Q 30/0241 |
| | | | | 715/753 |
| 2014/0331158 A1* | 11/2014 | Hicks | ................. | G06F 3/04886 |
| | | | | 345/173 |
| 2014/0331187 A1* | 11/2014 | Hicks | .................... | G06F 3/0488 |
| | | | | 715/845 |
| 2015/0089399 A1* | 3/2015 | Megill | ............... | H04L 12/1813 |
| | | | | 715/753 |
| 2015/0113407 A1* | 4/2015 | Hoffert | ............... | H04N 21/482 |
| | | | | 715/720 |
| 2016/0188201 A1* | 6/2016 | Hosier, Jr. | ............. | H04L 67/306 |
| | | | | 715/753 |
| 2016/0210016 A1* | 7/2016 | Shin | ................... | H04N 21/41407 |
| 2020/0033109 A1* | 1/2020 | Sugita | ................. | G01B 11/005 |
| 2022/0391456 A1* | 12/2022 | Weskamp | ............. | G06F 3/0485 |
| 2023/0177418 A1* | 6/2023 | Jung | ...................... | G06Q 50/01 |
| | | | | 705/7.13 |
| 2024/0176627 A1* | 5/2024 | He | .......................... | G06F 9/451 |
| 2024/0201840 A1* | 6/2024 | He | ........................ | G06F 3/0488 |
| 2024/0220085 A1* | 7/2024 | He | ........................ | G06F 3/0481 |
| 2024/0265785 A1* | 8/2024 | Sakamoto | ............ | G07F 17/329 |

* cited by examiner

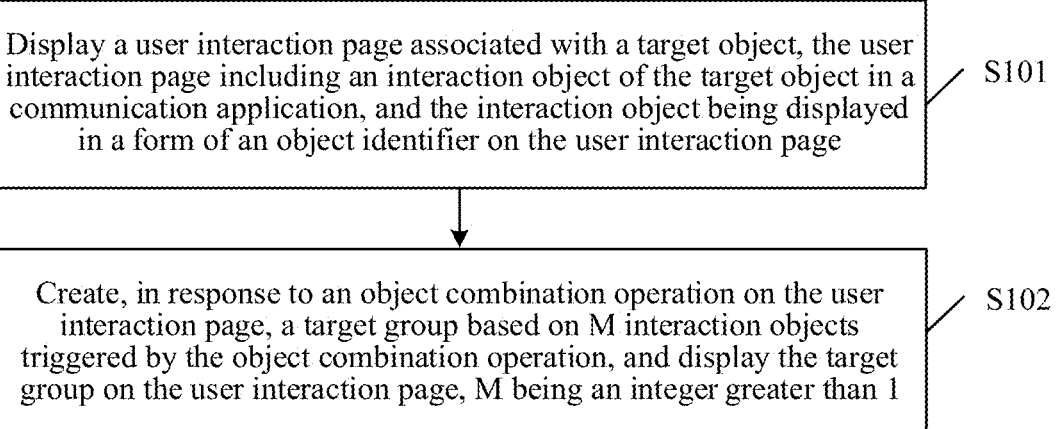

Display a user interaction page associated with a target object, the user interaction page including an interaction object of the target object in a communication application, and the interaction object being displayed in a form of an object identifier on the user interaction page — S101

Create, in response to an object combination operation on the user interaction page, a target group based on M interaction objects triggered by the object combination operation, and display the target group on the user interaction page, M being an integer greater than 1 — S102

FIG. 3

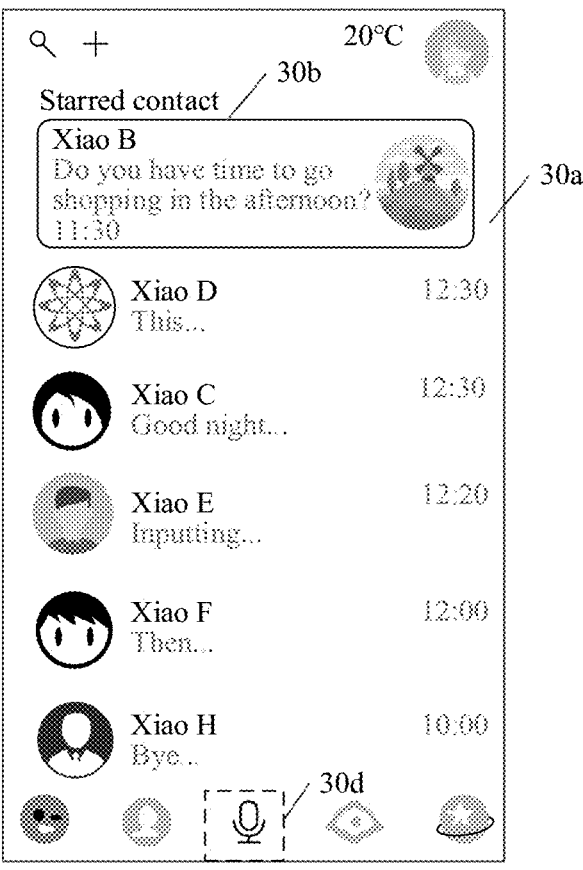

FIG. 4a

Group A1

Pinch

Group A2

Create a
group

Target group

Display a user interaction page associated with a target object, the user interaction page including an interaction object of the target object in a communication application, and the interaction object being dispersedly displayed in a form of a profile photo on the user interaction page /S201

Create, in response to an object combination operation on the user interaction page, a target group based on M interaction objects triggered by the object combination operation, and display the target group on the user interaction page, M being an integer greater than 1 /S202

Obtain, in response to a group dissolution operation for the target group, trigger initial positions and trigger destination positions of K dissolution trigger points determined by the group dissolution operation in the communication page, K being an integer greater than 1 /S203

Dissolve the target group in a case that a distance between the trigger initial positions corresponding to the K dissolution trigger points is less than a distance between the trigger destination positions corresponding to the K dissolution trigger points, and display dissolution success prompt information associated with the target group /S204

FIG. 10

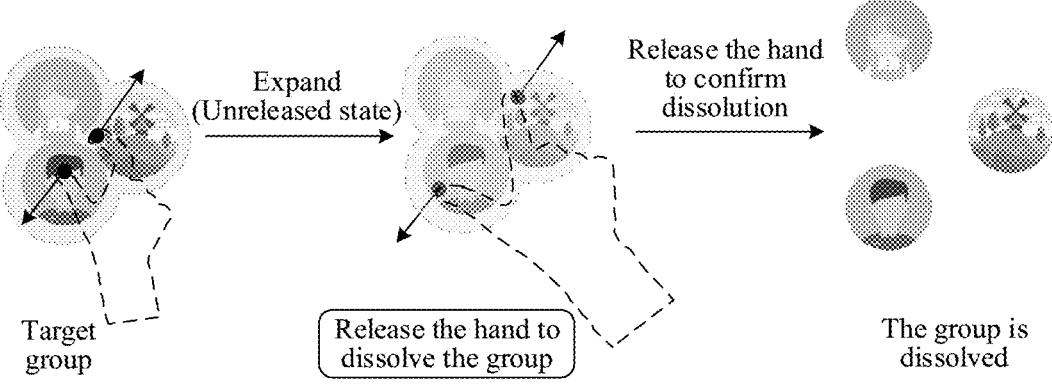

FIG. 11

GROUP PROCESSING METHOD AND APPARATUS, DEVICE, MEDIUM, AND PROGRAM PRODUCT

RELATED APPLICATIONS

This application is continuation of PCT Application No. PCT/CN2023/088866, filed on Apr. 18, 2023, which in turn claims priority to Chinese Patent Application No. 202211143770.2, entitled "GROUP PROCESSING METHOD AND APPARATUS, DEVICE, AND MEDIUM" filed with the Chinese Patent Office on Sep. 20, 2022. The two applications are both incorporated herein by reference in their entirety.

FIELD OF THE TECHNOLOGY

This application relates to the field of Internet technologies, and in particular, to user group processing.

BACKGROUND OF THE DISCLOSURE

With continuous development of Internet technologies, a user uses Internet applications to communicate more frequently. To improve communication efficiency between multiple users, one group may be created for the multiple users, so that fast communication among the multiple users can be implemented.

In a current group creation scenario, it is usually necessary to tap a "Create Group" button to enter a member selection list for group creation. By scrolling or searching the member selection list, a member to be added to a group is first located, and then the located member is tapped and added to the group. During group creation, a group creator needs to perform a series of tedious operations to successfully create a group, and when there is a relatively large number of members to be added to the group, frequent scrolling of the member selection list or a searching operation may need to be repeated, which increases the complexity of group creation operations by the group creator, thereby causing group creation efficiency to be low.

SUMMARY

Embodiments of this application provide a group processing method and apparatus, a device, a medium, and a program product, which can improve group creation efficiency in a communication application.

An aspect of the embodiments of this application provides a group processing method. The method includes displaying a user interaction page associated with a target object, the user interaction page comprising an interaction object of the target object in a communication application, and the interaction object being displayed in a form of an object identifier on the user interaction page; and creating a target group based on M interaction objects in response to an object combination operation on the user interaction page, and displaying the target group on the user interaction page, M being an integer greater than 1.

An aspect of the embodiments of this application provides a computer device, including a memory and a processor, where the memory is connected to the processor, the memory is configured to store a computer program, and the processor is configured to invoke the computer program, so that the computer device performs the method provided in the foregoing aspect of the embodiments of this application.

An aspect of the embodiments of this application provides a non-transitory computer readable storage medium. The computer readable storage medium stores a computer program. The computer program is suitable for being loaded and executed by a processor, so that a computer device having the processor performs the method provided in the foregoing aspect of the embodiments of this application.

In embodiments of this application, a user interaction page associated with a target object can be displayed. The user interaction page may include an interaction object of the target object in a communication application, and the interaction object is displayed in the form of an object identifier on the user interaction page. Further, in response to an object combination operation on the user interaction page, a target group may be created based on M interaction objects triggered by the object combination operation, and the target group is displayed on the user interaction page, where M is an integer greater than 1. For the interaction object that is displayed on the user interaction page and that is associated with the target object, an object combination operation may be performed on two or more interaction objects on the user interaction page, so that a new target group can be quickly established. In this way, operation costs of creating a target group can be reduced, and further, creation efficiency of a target group can be improved.

BRIEF DESCRIPTION OF THE DRAWINGS

FIG. 3 is a schematic flowchart of a group processing method according to an embodiment of this application.

FIG. 4a is a layout interface diagram of a user interaction page in a list form according to an embodiment of this application.

FIG. 10 is a schematic flowchart of another group processing method according to an embodiment of this application.

FIG. 11 is a schematic diagram of group dissolution according to an embodiment of this application.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

Figure 1:
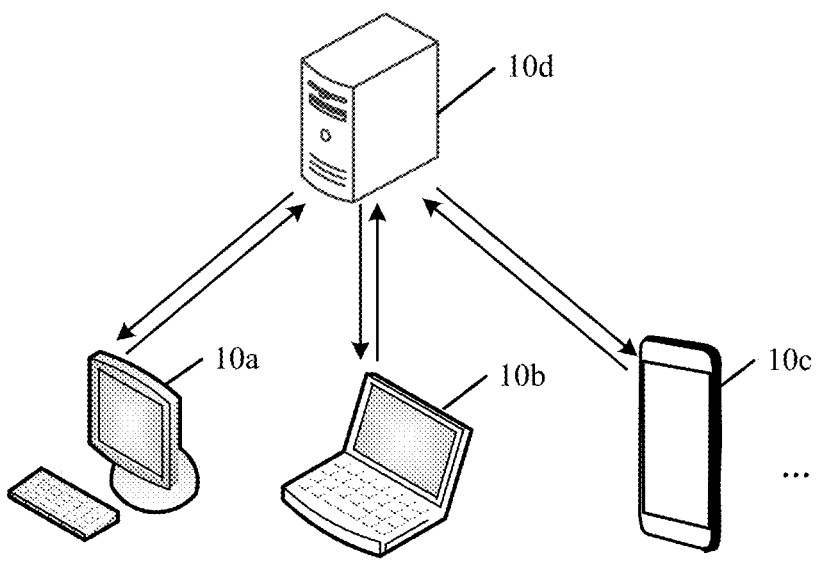
FIG. 1 is a schematic structural diagram of a network architecture according to an embodiment of this application.

FIG. 1 is a schematic structural diagram of a network architecture according to an embodiment of this application. As shown in FIG. 1, the network architecture may include a server 10*d* and a user terminal cluster. The user terminal cluster may include one or more user terminals. The quantity of user terminals is not limited herein. As shown in FIG. 1, multiple user terminals may specifically include a user terminal 10*a*, a user terminal 10*b*, a user terminal 10*c*, and the like. As shown in FIG. 1, the user terminal 10*a*, the user terminal 10*b*, and the user terminal 10*c* may separately establish a network connection to the server 10*d*, so that each user terminal can perform data exchange with the server 10*d* by using the network connection.

The server 10*d* may be an independent physical server, or may be a server cluster or a distributed system formed by multiple physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

Any user terminal in the user terminal cluster may include but is not limited to an electronic device that has a group creation/dissolution function, such as a smartphone, a tablet computer, a notebook computer, a palmtop computer, a mobile internet device (MID), a wearable device (such as a smart watch or a smart band), a smart voice interaction device, a smart home device (such as a smart TV), and an in-vehicle device.

It may be understood that, in specific implementations of this application, related data such as a profile photo or a nickname of a user may be involved. When the foregoing embodiment of this application is applied to a specific product or technology, a user permission or consent needs to be separately obtained for any one of the related data, and the related data needs to be collected, used, and processed in compliance with relevant laws and standards of a related country or region.

For ease of understanding, in some embodiments, any user terminal (for example, the user terminal 10*a*) in the user terminal cluster is used as an example for description. A communication application having a group creation/dissolution function may be installed in user terminal 10*a*. The communication application may include an instant messaging application, an office communication application, a social communication application, and the like. This is not limited to the disclosure of this application. A user holding the user terminal 10*a* (for ease of understanding, the user holding the user may be referred to as a target object) may register account information in the communication application installed in the user terminal 10*a*, and may further log in to the communication application by using the registered account information. The target object may be added as a friend to another user whose account information is registered in the communication application. Users that are buddies of each other in the communication application may interact with each other. For ease of understanding, a user or a group (a group to which the target object belongs) that interacts with the target object may be referred to as an interaction object. These interaction objects may be displayed on a user interaction page of the communication application. In this application, the presentation manner of the interaction object on the user interaction page may be in a list form, may be in a tile form, or may be in a bubble form, which is not limited in this application. The list form, the tile form, and the bubble form are described in detail later.

For the interaction object corresponding to the target object displayed on the user interaction page, the target object may create a new group (for example, may be referred to as a target group) by performing an action of pinching two or more interaction objects on the user interaction page. The "pinching" herein may be understood as gathering positions of two or more interaction objects displayed on the user interaction page, which may be specifically represented by touching profile photo regions of two or more interaction objects on the user interaction page, tapping and dragging the touched profile photos of the interaction objects, and gathering positions of the dragged interaction objects. In other words, the "pinch" action is for a profile photo of an interaction object displayed on the user interaction page, and a purpose of the action is to gather positions of multiple interaction objects that are dispersed in various position regions and displayed on the user interaction page, so as to implement a process of creating a target group.

When two or more interaction objects are buddies of the target object, the action of pinching the two or more interaction objects and adding the target object can create a new group (the target group). For example, when two or two interaction objects that are pinned by the user include a friend b1 and a friend b2 of the target object, a target group may be created by using the friend b1, the friend b2, and the target object. When one group (the group herein is an existing group to which the target object is added) exists in the two or more interaction objects, the existing group and another interaction object (that is, an interaction object other than the existing group in the two or more interaction objects that are pinched) may be pinched to add another interaction object to the existing group to obtain the target group. The target group herein may be an existing group that includes another interaction object. For example, when two or two interaction objects that are pinned by the user include the friend b1 of the target object and an existing group c1, the friend b1 may be added to the group c1 to obtain the target group. When two or more interaction objects are existing groups, by performing an action of pinching multiple existing groups, a target group may be created by using all group members in the multiple existing groups. For example, when two or two interaction objects that are pinned by the user include an existing group c1 and an existing group c2, a target group may be created by using group members in the group c1 and the group c2. In this case, the target group may refer to the group c2 to which group members in the group c1 are added, or the group c1 to which group members in the group c2 are added, or a new group is created by using all group members in the group c1 and the group c2, and the group c1 and the group c2 are dissolved. This is not limited to the embodiments of this application.

In some embodiments, the action of pinching two or more interaction objects may be referred to as an object combination operation, and the object combination operation may be used for creating a new group. In addition, the target object performs an expand gesture (which may also be referred to as a group dissolution operation, where the group dissolution on operation is used for dissolving a group that has been created) on the created group (for example, the target group), and after the target object releases the gesture, the group may be dissolved. The expand gesture herein may be understood as a gesture of touching a profile photo region of the created group (for example, the target group) on the user interaction page, where there are at least two position points of the touched profile photo region; and leaving positions of the touched at least two position points. For example, the user may touch the profile photo region of the target object on the user interaction page by using two joined fingers, and release the two joined fingers on the user interaction page. In this case, the operation may be referred to as an expand gesture. In the communication application, the target object may create a new group by using a pinch gesture, or may dissolve a created group by using an expand gesture. In this way, a group creation operation and a group dissolution operation can be simplified, thereby improving group creation efficiency and group dissolution efficiency.

Figure 2:
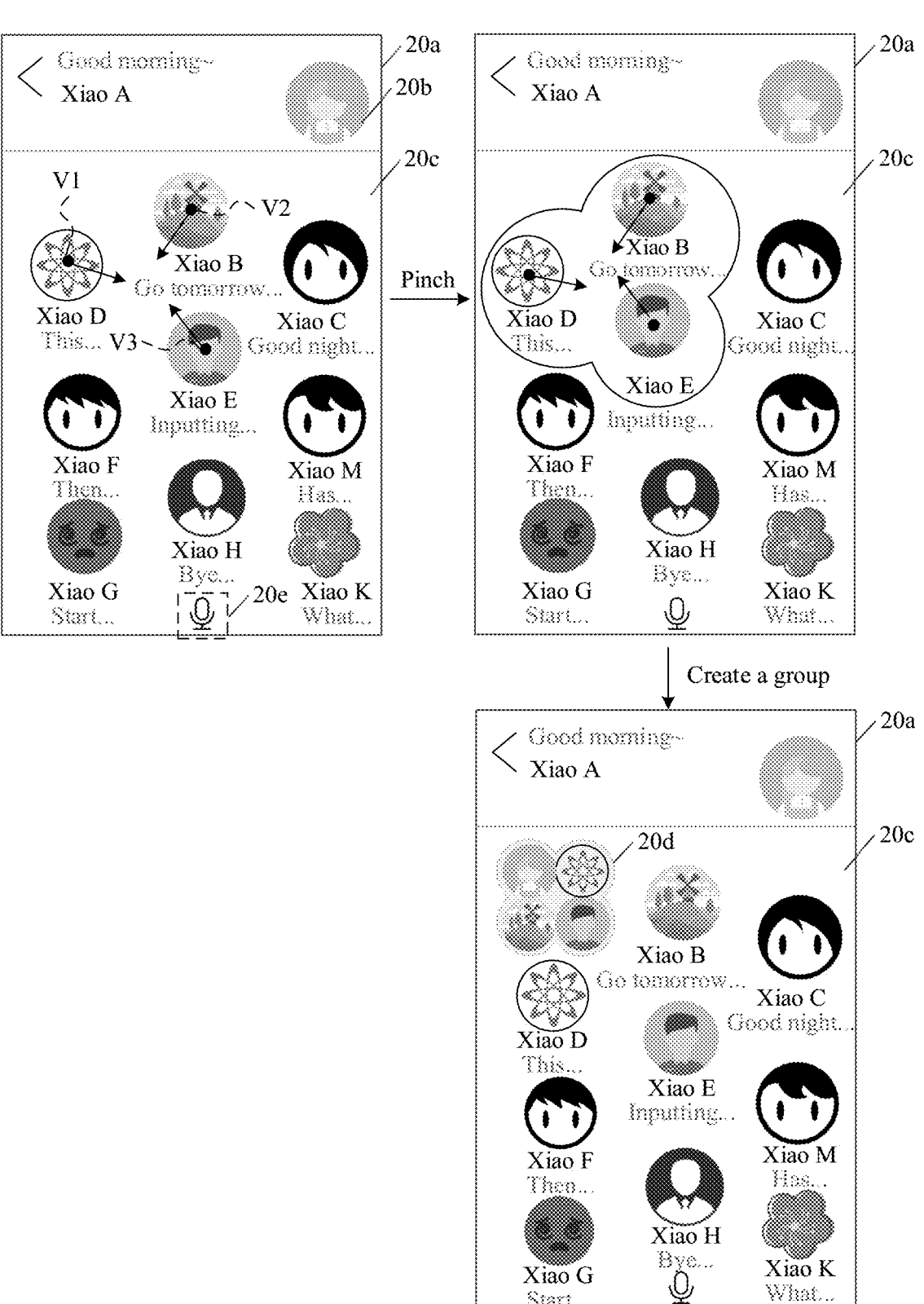
FIG. 2 is a schematic diagram of a group creation scenario according to an embodiment of this application.

FIG. 2 is a schematic diagram of a group creation scenario according to an embodiment of this application. User terminal 20a shown in FIG. 2 may be any user terminal in the user terminal cluster shown in FIG. 1. A communication application is integrated into user terminal 20a (which may be considered as being installed with a communication application client corresponding to the communication application). The communication application may provide a chat function with text, voice, and video to a user. For ease of understanding, a user holding the user terminal 20a may be referred to as a target object. The target object may register account information in the communication application integrated with the user terminal 20a. The account information may include information such as an account identifier, a login password, a nickname, and a profile photo of the target object in the communication application. For example, the account identifier may be a text string, or may be a number string, or may be a combination string including a text and a number, or may be another identifier in any form, such as a unique identifier code. This is not limited to the disclosure of this application. For example, the nickname of the target object in the communication application may be set to "Xiao A", and the profile photo of the target object (that is, user Xiao A) in the communication application may be shown by a picture 20b.

All users that use the communication application need to register account information in the communication application. Buddies may be added between different users by using account identifiers, and exchange with, such as, texts, voices, and videos may be performed between users that are buddies, or file transmission may be performed. In other words, the target object may interact with buddies in the communication application. These buddies that interact with the target object may be referred to as interaction objects (or may also be referred to as contact objects). For example, when the target object interacts with user Xiao B, message data between the target object and user Xiao B may be generated in the communication application, and user Xiao B may be referred to as an interaction object corresponding to the target object.

After the target object logs in to the communication application installed in the user terminal 20a by using account information of the target object, a user interaction page 20c (which may also be referred to as a message page)

in the communication application may be entered. The user interaction page 20c may display information such as a nickname (such as "Xiao A"), a profile photo (such as a picture 20b), and a personalized signature (such as "good morning") of the target object in the communication application. The user interaction page 20c may further display interaction objects of the target object in the communication application, such as user Xiao B, user Xiao C, user Xiao D, user Xiao E, . . . , and user Xiao K. Specifically, information such as a nickname, a profile photo, and a latest message that are corresponding to each interaction object may be displayed.

A layout of the interaction objects on the user interaction page 20c shown in FIG. 2 is only an example manner (the layout form shown in FIG. 2 may be referred to as a bubble form). In some embodiments, another form of the layout form may be used. For example, the user interaction page may lay out the interaction objects in a list manner, or lay out the interaction objects in a tile manner. This application sets no limitation on the layout form of the interaction objects in the user interaction page. The display information of each interaction object on the user interaction page may include information such as a nickname, a profile photo, a latest message, a sending or receiving time of the latest message, and a quantity of unread messages. This application sets no limitation on the display information type of each interaction object. A display position of each interaction object on the user interaction page may be determined by an interaction time between the target object and the interaction object. For example, a later interaction time causes a higher display position of the interaction object on the user interaction page, or a later interaction time causes a display position of the interaction object on the user interaction page to be closer to a central position. The manner of determining the display position of each interaction object on the user interaction page is not limited in this application.

For each interaction object displayed on the user interaction page 20c, the target object may perform an object combination operation on two or more interaction objects on the user interaction page 20c by using a pinch gesture. In this case, the user terminal 20a may respond to the object combination operation of the target object on the two or more interaction objects, and form a new group by using the target object and the two or more interaction objects that are pinched by the target object. For example, when the target object touches the user interaction page 20c in the user terminal 20a, the user terminal 20a may obtain a trigger point of the target object on the user interaction page 20c (for ease of understanding, the trigger point herein may be determined as a combination trigger point), and obtain a quantity corresponding to the combination trigger point, and a position of the combination trigger point on the user interaction page 20c, for example, the target object may touch the user interaction page 20c by using multiple fingers. In addition, the user terminal 20a may obtain a region position corresponding to each interaction object displayed on the user interaction page 20c. If a quantity of combination trigger points is greater than or equal to 2, and positions of two or more combination trigger points in all combination trigger points belong to the region positions corresponding to the interaction objects, it may be determined that the target object triggers a pinch gesture (or may be considered as that the target object triggers an object combination operation). If the quantity of combination trigger points is less than 2, or a position of less than two combination trigger points in all the combination trigger points belongs to the region positions corresponding to the interaction objects, it may be determined that the target object does not trigger a pinch gesture.

As shown in FIG. 2, combination trigger points of target objects on the user interaction page 20c may be sequentially denoted as a trigger point V1, a trigger point V2, and a trigger point V3, where a position of the trigger point V1 on the user interaction page 20c belongs to a region position corresponding to user Xiao D, a position of the trigger point V2 on the user interaction page 20c belongs to a region position corresponding to user Xiao B, and a position of the trigger point V3 on the user interaction page 20c belongs to a region position corresponding to user Xiao E. Then, it may be determined that the target object triggers an object combination operation (pinch gesture). The user terminal 20a may continue to obtain a touch movement event of the target object on the user interaction page 20c. For example, user Xiao B, user Xiao D, and user Xiao E that are triggered by the object combination operation may be moved on the user interaction page 20c based on a trajectory determined by the object combination operation, and the positions respectively corresponding to the trigger point V1, the trigger point V2, and the trigger point V3 are continuously updated by using the object combination operation. Alternatively, it may be considered that the region positions of user Xiao B, user Xiao D, and user Xiao E on the user interaction page 20c are continuously updated.

When the target object ends the object combination operation, region positions of user Xiao B, user Xiao D, and user Xiao E after the movement ends may be obtained. If two regions intersect in the region positions of user Xiao B, user Xiao D, and user Xiao E after the movement ends, user Xiao B, user Xiao D, user Xiao E, and the target object may be combined into a new group 20d, and the group 20d is displayed on the user interaction page 20c. It is to be understood that because the group 20d is newly displayed on the user interaction page 20c, a display position of each interaction object when the group 20d is not created may be adjusted on the user interaction page 20c. For example, user Xiao B, user Xiao D, and user Xiao E may still be separately displayed on the user interaction page 20c.

In some embodiments, when the target object wants to create a new group in the communication application, the target object may directly trigger an object combination operation on two or more interaction objects in the user interaction page 20c, so as to quickly create a new group (which may include the two or more interaction objects that are triggered by the object combination operation and the target object). In this way, a group creation operation can be simplified, and group creation efficiency is greatly improved.

FIG. 3 is a schematic flowchart of a group processing method according to an embodiment of this application. It may be understood that the group processing method is performed by a computer device, and the computer device may be a user terminal (for example, the user terminal 10a shown in FIG. 1) or a server (the server 10d shown in FIG. 1). This is not limited to the disclosure of this application. The group processing method may include the following S101 and S102:

S101: Display a user interaction page associated with a target object, the user interaction page including an interaction object of the target object in a communication application, and the interaction object being displayed in a form of an object identifier on the user interaction page.

Specifically, a communication application may be deployed in the computer device. The communication application may support a chat function with, such as, a text, a voice, and a video, or may further support a file transmission function with, such as, a text, a picture, and a video between different users. Certainly, to improve communication efficiency between multiple users, the communication application may further support a group creation/dissolution function. By triggering a group creation function in the communication application, multiple users that have the same interest or the same feature in the communication application may be combined into one group, and communication between the multiple users can be implemented in the group. The communication application in this application may be any application software that supports user communication, such as an instant messaging application, an office communication application, or a social communication application. This is not limited to the disclosure of this application.

When the target object logs in to the communication application by using pre-registered account information, a user interaction page (for example, the user interaction page 20c in the foregoing embodiment corresponding to FIG. 2) of the communication application may be entered, and the user interaction page may be used for displaying an interaction object of the target object in the communication application. For example, the user interaction page may be a default message page directly displayed after the communication application is started. When the target object performs a start operation on the communication application in the computer device, the computer device may display, in response to the start operation, the user interaction page associated with the target object. The interaction object may be a friend or group in contact with the target object in a recent period of time (for example, the recent one month or the recent one week). The interaction object may be presented in a form of an object identifier on the user interaction page. An object identifier of an interaction object may serve to identify the interaction object and distinguish the interaction object from another interaction object. By displaying the object identifier, a viewer may identify, by using the foregoing function of the object identifier, an interaction object used for creating a target group.

In this application, a presentation form of the object identifier is not limited, provided that the foregoing function of identifying an interaction object can be performed. For example, the object identifier may be presented in a form of a user profile photo, a user nickname, a user latest message, or the like. A presentation style is a circle, a square, a triangle, or another form defined by the user. This application sets no limitation on a presentation form of each interaction object on the user interaction page.

In one embodiment, each interaction object displayed on the user interaction page may be considered as an object that can be selected when the target object creates a group. After account information is successfully used for logging in to the communication application, the user interaction page in this case may include all interaction objects of the target object in the communication application. The target object may filter the interaction objects displayed on the user interaction page, so as to narrow an object selection range of the target object in creating a group, thereby further improving group creation efficiency. For example, the target object may input object filtering information on the user interaction page. In this case, after obtaining the object filtering information, the computer device may obtain, in the communication application, an object set associated with the target object, where the object set may include all the interaction objects corresponding to the target object, and further may obtain, from the object set, interaction objects that meet the object filtering information, and display a user interaction page that includes these filtered interaction objects. The object filtering information may include but is not limited to a time range, an object feature, and the like. For example, when the time range is set to the recent one week, an interaction object of the target object in the recent one week may be filtered from the object set. The object feature may include a user label, duration in which the user uses the communication application, and the like. This is not limited to the disclosure of this application.

In one embodiment, in the communication application, a layout form of the user interaction page associated with the target object and a display position and a display region size of each interaction object on the user interaction page may be determined by using a preset layout rule. The layout form of the user interaction page may include a list form, a tile form, a bubble form, and the like. This is not limited to the disclosure of this application.

① The list form may mean that each interaction object corresponding to the target object is displayed in a form of a list, and each interaction object may be presented in a form of information such as a user profile photo, a user nickname, and a user latest message. A display sequence (which may also be considered as a display position) of each interaction object on the user interaction page may be determined according to an interaction time between the interaction object and the target object. For example, a later interaction time between the interaction object and the target object means that the display position of the interaction object on the user interaction page is ranked more forward, and an earlier interaction time between the interaction object and the target object means that the display position of the interaction object on the user interaction page is ranked more backward.

In one embodiment, each interaction object corresponding to the target object may be displayed on the user interaction page according to an affinity relationship between each interaction object and the target object (for example, a higher interaction frequency between the interaction object and the target object means a higher affinity between the interaction object and the target object, and a lower interaction frequency between the interaction object and the target object means a lower affinity between the interaction object and the target object). Each interaction object corresponding to the target object may be displayed on the user interaction page. For example, an interaction object with a higher affinity is displayed at a more forward display position on the user interaction page, and an interaction object with a lower affinity is displayed at a more backward display position on the user interaction page. Alternatively, each interaction object corresponding to the target object may be displayed according to a customized display order of the target object. For example, information such as an alphabetical order of nicknames of interaction objects, a quantity of nickname characters, and profile photo colors may be used. This is not limited to the disclosure of this application.

In one embodiment, on the user interaction page in the form of a list, the display sequence of each interaction object on the user interaction page may be determined according to identifier information set by the target object for the interaction object (for example, the identifier information may be a label that carries a starred contact, for example, an interaction object that is set to a starred contact may be considered to carry identifier information), and the priority of an interaction object set with identifier information is higher than the priority of an interaction object not set with identifier information. For example, an interaction object that is set to be a starred contact may be displayed at the start position on the user interaction page, and another interaction object that is not set to be a starred contact may be displayed at a destination position on the user interaction page. That is, an interaction object that is set to be a starred contact may be displayed in front of another interaction object that is not set to be a starred contact. When the target object has multiple interaction objects that are set to be starred contacts, the multiple interaction objects that are set to be starred contacts may be sorted and displayed according to interaction times with the target object. Similarly, other interaction objects that are not set to be starred contacts may be sorted and displayed according to interaction times with the target object.

In one embodiment, a display region size of each interaction object on the user interaction page may be the same or may be different. For example, a later interaction time between an interaction object and the target object means a larger display region size corresponding to the interaction object, or a display region size of an interaction object that is set to be a starred contact is greater than a display region size of an interaction object that is not set to be a starred contact. The presentation form of each interaction object on the user interaction page is not limited in this application.

② The tile form may mean that each interaction object corresponding to the target object is displayed in a tile form, and each interaction object may be presented in a form of information such as a user profile photo and a user nickname. The tile form may refer to creating an independent sub-page for each interaction object (a sub-page herein may be considered as a window, and the window may be horizontal or vertical). Further, sub-pages of the interaction objects may be sequentially and independently displayed on the user interaction page, that is, the sub-pages corresponding to the interaction objects may be simultaneously displayed on the user interaction page. A display sequence of each interaction object on the user interaction page may also be determined by an interaction time between the interaction object and the target object, and details are not described herein again. On a user interaction page in the tile form, a display region size of each interaction object on the user interaction page may be set to be the same region size. Certainly, different display region sizes may also be set, which is not limited in some embodiments. For a manner of determining the display sequence of the interaction objects in the tile form, refer to the manner of determining the display sequence of the interaction objects in the foregoing list form. Details are not described herein again.

③ The bubble form may mean that each interaction object corresponding to the target object is displayed in a bubble form of a user profile photo, and each interaction object may be presented in a two-dimensional or three-dimensional plane in a form of a user profile photo. Certainly, information such as a user nickname corresponding to each interaction object may also be displayed, as shown on the user interaction page 20c in the foregoing embodiment corresponding to FIG. 2. This is not limited to the disclosure of this application. A display position of each interaction object corresponding to the target object on the user interaction page may also be determined by an interaction time between the interaction object and the target object. For example, the interaction objects may be sequentially displayed on the user interaction page in a reverse order of interaction times. A later interaction time means that a display position of the interaction object on the user interaction page is more forward. An earlier interaction time means that a display position of the interaction object on the user interaction page is more backward. Alternatively, the interaction objects may be sequentially displayed on the user interaction page in a clockwise or counterclockwise direction in a reverse order of the interaction times. For example, a later interaction time means that a display position of the interaction object on the user interaction page is closer to a center position of the user interaction page, and an earlier interaction time means that a display position of the interaction object on the user interaction page is farther from the center position of the user interaction page.

Display region sizes of the interaction objects on the user interaction page may be the same or different. If the display region sizes of the interaction objects on the user interaction page are the same, a display region size corresponding to a single interaction object may be determined according to a terminal screen size of the computer device and a quantity of interaction objects. When the display region sizes of the interaction objects on the user interaction page are different, the display region size corresponding to each interaction object may also be determined according to an interaction time between each interaction object and the target object. For example, the display region sizes corresponding to the interaction objects may be successively reduced in a reverse order of interaction times. A later interaction time indicates a larger display region size corresponding to the interaction object, and an earlier interaction time indicates a smaller display region size corresponding to the interaction object.

In one embodiment, when identifier information is set for some interaction objects (for example, set to be starred contacts) corresponding to the target object, it may be determined that the priority of an interaction object set with identifier information is higher than an interaction object not set with identifier information. For example, a display position of an interaction object set to be a starred contact on the user interaction page is more forward than a display position of an interaction object not set to be a starred contact on the user interaction page, or a display position of an interaction object set to be a starred contact on the user interaction page is closer to the center position of the user interaction page than a display position of an interaction object not set to be a starred contact on the user interaction page, or a display region size of an interaction object set to be a starred contact on the user interaction page is larger than or equal to a display region size of an interaction object set not to be a starred contact on the user interaction page. For a manner of determining the display sequence of the interaction objects in the bubble form, also refer to the manner of determining the display sequence of the interaction objects in the foregoing list form. Details are not described herein again.

In one embodiment, when the user performs a trigger operation on the communication application deployed in the computer device, the computer device may start the communication application and enter the user interaction page of the communication application. In this case, a layout form of the user interaction page may be the foregoing list form, and the user interaction page may further include a switch control. The switch control may be used for switching the layout form of the user interaction page. For example, when a current user interaction page is in a list form, a trigger operation may be performed on the switch control, and the user interaction page may be converted from the list form to a bubble form or a tile form, that is, the user may select the layout form of the user interaction page according to specific requirements. Certainly, the user may select the tile form or the bubble form as a default layout form of the user interaction page. After the communication application is started, the tile form or the bubble form of the user interaction page may be directly entered. Alternatively, the user interaction page itself only supports any one layout form of the foregoing list form, tile form, or bubble form, which is not limited in this application.

Figure 4B:
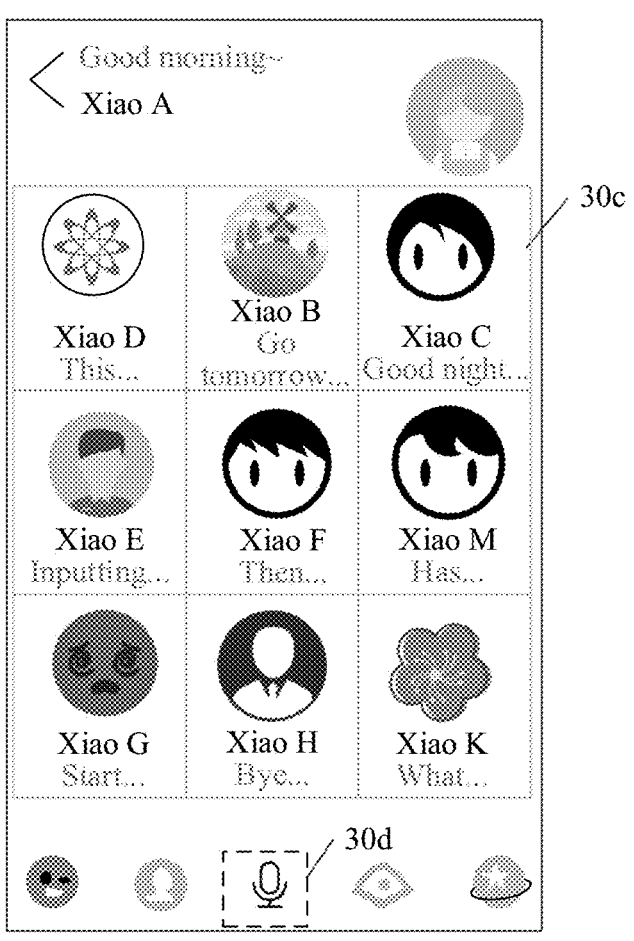
FIG. 4b is a layout interface diagram of a tiled user interaction page according to an embodiment of this application.

The following describes different layout forms of the communication interaction page with reference to FIG. 2, FIG. 4a, and FIG. 4b. When the user interaction page is in the bubble form, the presentation manner of each interaction object of the target object on the user interaction page may be the user interaction page 20c shown in FIG. 2, and the interaction objects are distributed on the user interaction page 20c in a form of profile photos.

When the user interaction page is in the list form, refer to FIG. 4a. FIG. 4a is a layout interface diagram of a user interaction page in a list form according to an embodiment of this application. As shown in FIG. 4a, a user interaction page 30a is a page that is laid out in a list form, and interaction objects on the user interaction page 30a may be displayed in the list form. Each interaction object on the user interaction page 30a may display information such as a user profile photo, a user nickname, a latest message, and a latest interaction time that are corresponding to the interaction object, and certainly, may further display a quantity of unread messages corresponding to the interaction object. This is not limited to the disclosure of this application. An interaction object that is set to be a starred contact (Xiao B) may be separately displayed in a region 30b on the user interaction page 30a, and is topped on the user interaction page 30a, that is, displayed in at the start position of the user interaction page. Other interaction objects that are not set to be starred contacts (for example, Xiao D, Xiao C, Xiao E, Xiao F, and Xiao H) may be displayed behind user Xiao B, and the other interaction objects that are not set to be starred contacts may be sorted and displayed according to latest interaction times. For example, the latest interaction time (12:30) between the target object and Xiao C is later than the latest interaction time (12:20) between the target object and Xiao E, and then Xiao C may be displayed before Xiao E.

When the user interaction page is in the tile form, refer to FIG. 4b. FIG. 4b is a layout interface diagram of a tiled user interaction page according to an embodiment of this application. As shown in FIG. 4b, a user interaction page 30c is a page that is laid out in a tile form, and interaction objects on the user interaction page 30c may be displayed in the tile form. Each interaction object on the user interaction page 30c may display information such as a user profile photo and a user nickname that are corresponding to the interaction object, and a display region size corresponding to each interaction object may be consistent. Interaction objects (Xiao B, Xiao D, Xiao C, Xiao E, and Xiao F) on the user interaction page 30c may be sorted and displayed according to latest interaction times with the target object. For example, the latest interaction times corresponding to the interaction objects displayed on the user interaction page 30c are successively: Xiao D, Xiao B, Xiao C, Xiao E, Xiao F, Xiao M, Xiao G, Xiao H, and Xiao K in descending order of times. In other words, the interaction objects may be displayed on the user interaction page 30c in the foregoing order.

In one or more embodiments, user interaction pages in different layout forms may include a message sending component, such as a control 20e on the user interaction page 20c shown in FIG. 2, a control 30d on the user interaction page 30a shown in FIG. 4a, and a control 30d on the user interaction page 30c shown in FIG. 4b. Message content determined by a first component trigger operation may be obtained by performing the first component trigger operation (for example, tapping the control 30*d* and inputting the message content) on a message sending component (for example, the control 30*d*) on the user interaction page. Further, a second component trigger operation (for example, the message content entered by the user is dragged to a profile photo display region of an interaction object) may be performed on the message sending component on the user interaction page, to send the message content to the interaction object determined by the second component trigger operation. In this way, multiple interaction objects can be interacted on the user interaction page without performing a message session page switching operation, thereby improving interaction efficiency.

The user interaction page 30*a* shown in FIG. 4*a* and the user interaction page 30*c* shown in FIG. 4*b* are merely used as examples for description. In addition, the user interaction page may be in another layout form. For details, refer to the foregoing description. This application sets no limitation on the layout form of the user interaction page. For ease of understanding, subsequently, the user interaction page that is laid out in the bubble form is used as an example for description.

S102: Create, in response to an object combination operation on the user interaction page, a target group based on M interaction objects triggered by the object combination operation, and display the target group on the user interaction page, M being an integer greater than 1.

Specifically, for the interaction objects displayed on the user interaction page, the target object may create, by using a pinch gesture (an object combination operation), a new group by using two or more interaction objects triggered by the pinch gesture. When the target object performs a gesture trigger operation on the user interaction page, position information of N combination trigger points (for example, the trigger point V1, the trigger point V2, and the trigger point V3 in the foregoing embodiment corresponding to FIG. 2) determined by the gesture trigger operation on the user interaction page may be obtained, where N herein may be an integer greater than or equal to M, and M may be an integer greater than 1. For example, M may be a value of 2, 3, or . . . . Further, a region position corresponding to each interaction object on the user interaction page may be obtained. The region position herein may be determined according to a display position and a display region size of the interaction object on the user interaction page. For example, when the interaction object is presented in a form of a user profile photo, the display position of the interaction object on the user interaction page may be coordinates of a center point of the user profile photo of the interaction object, and the display region size of the interaction object on the user interaction page may be a radius of the user profile photo of the interaction object. If position information of M combination trigger points in the N combination trigger points belongs to region positions corresponding to the interaction objects on the user interaction page, the gesture trigger operation may be determined as an object combination operation. If position information of each combination trigger point in the N combination trigger points does not belong to a region position corresponding to any interaction object on the user interaction page, or position information of only one combination trigger point in the N combination trigger points belongs to a region position corresponding to an interaction object, it may be determined that the gesture trigger operation is not an object combination operation.

For example, it is assumed that the N combination trigger points determined by the gesture trigger operation include a combination trigger point V4 and a combination trigger point V5, position information of the combination trigger point V4 is denoted as coordinates 1, and position information of the combination trigger point V5 is denoted as coordinates 2. When the coordinates 1 belong to a region position corresponding to an interaction object 1 (for example, a coverage region of a user profile photo of the interaction object 1), and the coordinates 2 belong to a region position corresponding to an interaction object 2 (for example, a coverage region of a user profile photo of the interaction object 2), it may be determined that the gesture trigger operation is an object combination operation used for creating a group. In this case, the interaction object 1 and the interaction object 2 may be considered as the M interaction objects triggered by the object combination operation (the value of M herein is 2). When the coordinates 1 belong to the region position corresponding to the interaction object 1, and the coordinates 2 do not belong to a region position corresponding to any interaction object on the user interaction page, it may be determined that the gesture trigger operation is not an object combination operation used for creating a group.

When the target object uses one finger to touch the user interaction page, in this case, only one trigger point can be detected, and it may be determined that a touch event (a gesture trigger operation) of the current target object is not an object combination operation. When the target object touches the user interaction page by using two or more fingers, in this case, two or more trigger points may be detected, and one finger may be corresponding to one trigger point. If touch positions of the two or more fingers are positions of interaction objects displayed on the user interaction page, it may be determined that the touch event of the current target object is an object combination operation. If the touch positions of the two or two fingers are not positions of the interaction objects displayed on the user interaction page, or only one of the touch positions of the two or two fingers is the position of the interaction object displayed on the user interaction page, it may be determined that the touch event of the current target object is not an object combination operation.

Further, the computer device may respond to the object combination operation on the user interaction page, and may create a target group by using the M interaction objects triggered by the object combination operation, so that the target group can be displayed on the user interaction page, and region positions of original interaction objects on the user interaction page are adjusted based on the target group. It may be understood that when the M interaction objects triggered by the object combination operation are all buddies of the target object in the communication application, the finally created target group may include the M interaction objects triggered by the object combination operation and the target object. When at least one of the M interaction objects triggered by the object combination operation is a created group, because the target object has joined the created group, the M interaction objects triggered by the object combination operation may be directly combined into a new target group.

A condition for creating the target group on the user interaction page based on the object combination operation may include: moving, in response to the object combination operation on the user interaction page, the M interaction objects triggered by the object combination operation on the user interaction page; and creating the target group based on the M interaction objects in a case that the M moved interaction objects overlap. Specifically, after the object combination operation of the target object on the user interaction page is obtained, the M interaction objects triggered by the object combination operation may be determined on the user interaction page based on a trajectory corresponding to the object combination operation, and the M interaction objects are moved to destination positions of the combination operation on the user interaction page. The destination positions herein may be coordinates of center positions respectively corresponding to the M interaction objects when the target object ends the object combination operation. For example, when the object combination operation starts, a trajectory of the object combination operation on the user interaction page may be obtained in real time, and based on a start position of the trajectory on the user interaction page, the M interaction objects triggered by the object combination operation may be determined (for example, the start position of the trajectory is in display regions of the M interaction objects on the user interaction page), a position at which the object combination operation ends may be determined as the destination position of the trajectory on the user interaction page, and then the M interaction objects may be moved to the destination position of the trajectory. The object combination operation in this application may be considered as a continuous action. In a process of performing the object combination operation on the user interaction page, when it is detected that a quantity of trigger points on the user interaction page is less than 2, it may be determined that the object combination operation ends.

When region overlapping exists at region positions corresponding to the M moved interaction objects (for example, some or all coverage regions of the M moved interaction objects on the user interaction page overlap), it may be considered that the M moved interaction objects overlap, and then a target group may be created based on the M interaction objects (the target group herein may be a newly created group, or may be a group obtained after an interaction object is added to an existing group; and for specific description, refer to the foregoing related description, and details are not described herein again). When region overlapping does not exist at the region positions corresponding to the M moved interaction objects, it may be considered that the M moved interaction objects do not overlap, and then the M moved interaction objects may return to initial positions on the user interaction page, that is, positions before the movement.

Figure 5:
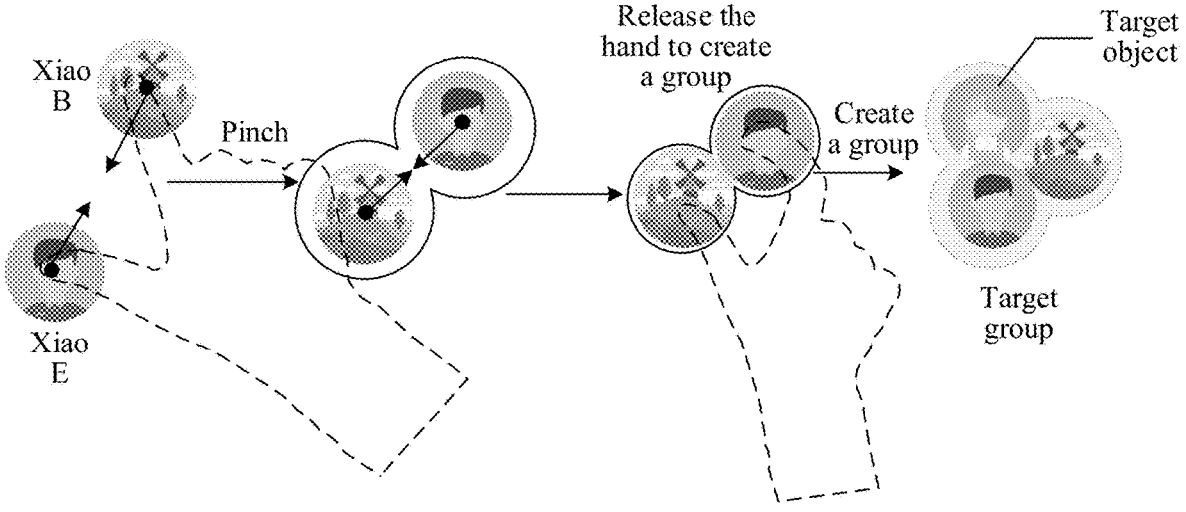
FIG. 5 is a schematic diagram of group creation according to an embodiment of this application.

In one embodiment, when the M interaction objects triggered by the object combination operation are buddies of the target object, refer to FIG. 5. FIG. 5 is a schematic diagram of group creation according to an embodiment of this application. As shown in FIG. 5, after the object combination operation is triggered by the target object on the user interaction page, the M interaction objects triggered by the object combination operation may be user Xiao B and user Xiao E. The value of M herein is 2. The target object may pinch user Xiao B and user Xiao E, that is, perform an object combination operation on user Xiao B and user Xiao E. In this case, user Xiao B and user Xiao E may be moved according to a trajectory of the object combination operation, and positions of user Xiao B and user Xiao E on the user interaction page are continuously updated. When edges of user profile photos of user Xiao B and user Xiao E after the movement intersect, it may be determined that user Xiao B and user Xiao E after the movement overlap. In this case, prompt information (for example, "release the hand to create a group") may be displayed on the user interaction page for the target object, that is, it indicates that if the target object ends the object combination operation in this case, user Xiao B, user Xiao E, and the target object may be combined into a new group. In some embodiments, the new group may be referred to as the target group.

It may be understood that when performing the object combination operation on user Xiao B and user Xiao E on the user interaction page, the target object may update position information of user Xiao B and user Xiao E in real time, and when detecting that the position information (destination positions) of user Xiao B and user Xiao E on the user interaction page meets an overlap condition, display prompt information (for example, "release the hand to create a group") on the user interaction page, so as to indicate that the target object may end the object combination operation, and combine user Xiao B, user Xiao E, and the target object into the target group, as shown in the creation process of the target group in FIG. 5. In one embodiment, when performing the object combination operation on user Xiao B and user Xiao E on the user interaction page, the target object first ends the object combination operation, and obtains the position information of user Xiao B and user Xiao E at the end of the object combination operation. When the position information (destination positions) of user Xiao B and user Xiao E at the end of the object combination operation meets the overlap condition, user Xiao B, user Xiao E, and the target object may be combined into the target group, that is, prompt information (for example, "release the hand to create a group") may not be displayed on the user interaction page.

Figure 6:
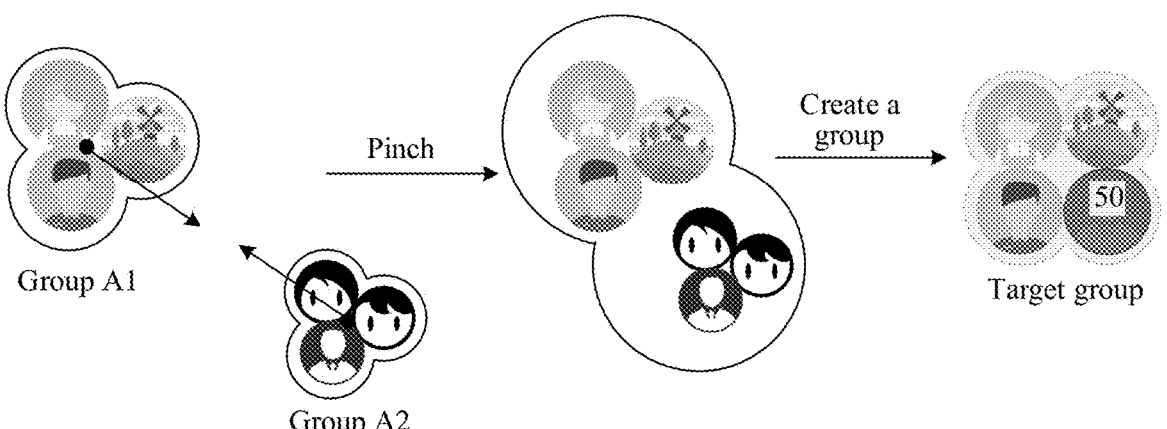
FIG. 6 is a schematic diagram of another group creation according to an embodiment of this application.

In one embodiment, when the M interaction objects triggered by the object combination operation are groups to which the target object is added, refer to FIG. 6. FIG. 6 is a schematic diagram of another group creation according to an embodiment of this application. As shown in FIG. 6, after the object combination operation is triggered by the target object on the user interaction page, the M interaction objects triggered by the object combination operation may be group A1 and a group A2. The value of M herein is 2. The target object may pinch the group A1 and the group A2, that is, perform an object combination operation on the group A1 and the group A2. In this case, group A1 and the group A2 may be moved according to a trajectory of the object combination operation, and positions of the group A1 and the group A2 on the user interaction page are continuously updated. When the edge of a group profile photo of the moved group A1 intersects the edge of a group profile photo of the group A2, it may be determined that the moved group A1 overlaps with the moved group A2. In this case, the target object may end the object combination operation. In this case, group members in group A1 and group members in the group A2 may be combined into a new group (that is, the target group). For a process of combining the group members and the group A2 into a new group, refer to related descriptions in the foregoing embodiment corresponding to FIG. 5. Details are not described herein again. In one embodiment, the M interaction objects triggered by the object combination operation may include buddies corresponding to the target object, or may include existing groups to which the target object is added. In this way, the groups and the buddies may be combined into a target group. In this case, a group identifier (such as a group number) of the target group may use a group identifier of the existing group, that is, the target group is an existing group whose group members are updated. Certainly, the group identifier of the target group may alternatively be a newly created group identifier. In this case, the target group may be a new group including the buddies and the group members of the existing group. After the target group is successfully created, the existing group may be dissolved. For an operation process in which the target group is created by using the M interaction objects that are buddies of the target object or existing groups to which the target object is added, refer to related descriptions in the embodiment corresponding to FIG. 5. Details are not described herein again.

In one or more embodiments, the M interaction objects triggered by the object combination operation may include two or more interaction objects. That the M moved interaction objects overlap may be considered as that some or all regions in region positions corresponding to the M interaction objects overlap, or may be considered that intersection exists between region edges corresponding to the M interaction objects. The following uses the value of M being 2 as an example to describe a process of determining overlapping of the M moved interaction objects. When the value of M is 2, the M interaction objects triggered by the object combination operation may include a first interaction object and a second interaction object. A destination position of the first interaction object at the end of the object combination operation may be referred to as a first destination position, and a destination position of the second interaction object at the end of the object combination operation may be referred to as a second destination position.

The computer device may determine an object spacing distance between the first interaction object and the second interaction object according to the first destination position and the second destination position, and determine a destination length threshold on the user interaction page based on a region size corresponding to the first interaction object (for example, a radius of a coverage region of a profile photo of the interaction object) and a region size corresponding to the second interaction object. If the object spacing distance is less than the destination length threshold, it may be determined that the moved first interaction object overlaps the moved second interaction object. In this case, the target group may be created by using the first interaction object and the second interaction object. If the object spacing distance is greater than or equal to the destination length threshold, it may be determined that the moved first interaction object does not overlap with the moved second interaction object, and further, the first interaction object may be returned from the first destination position to a first initial position (that is, position information of the first interaction object before being moved), and the second interaction object is returned from the second destination position to a second initial position (that is, position information of the second interaction object before being moved).

Figure 7:
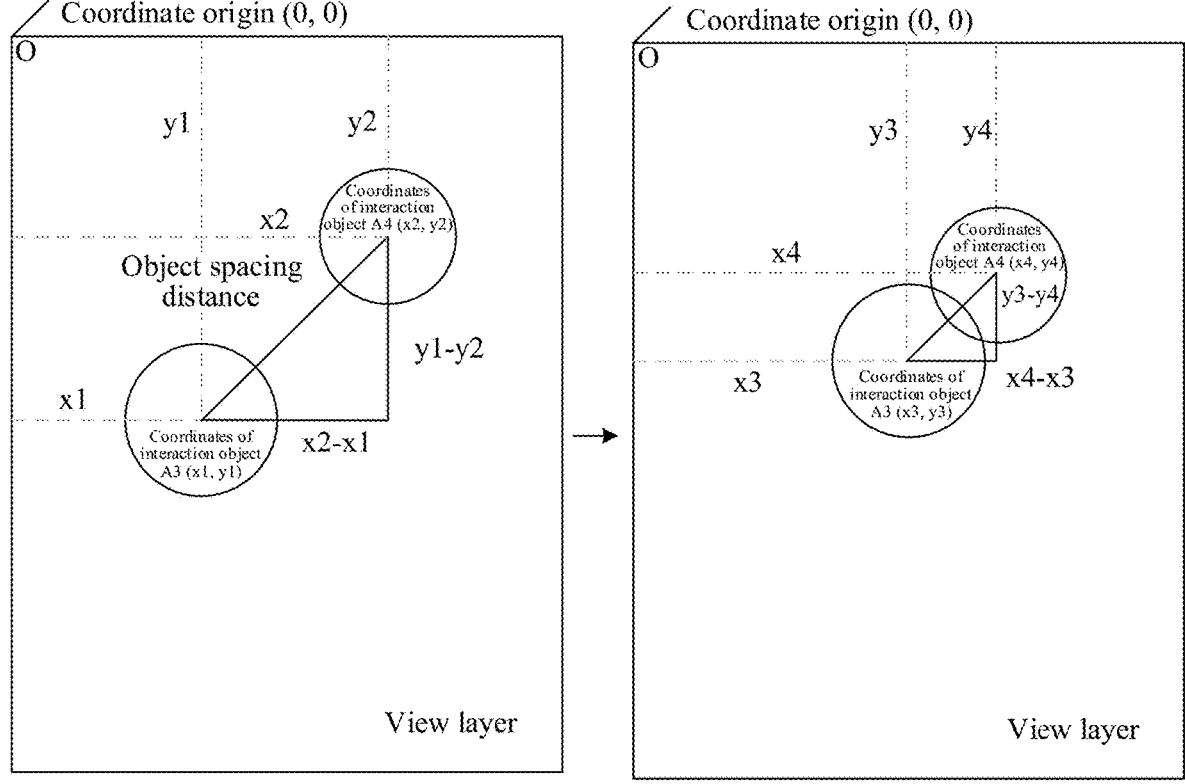
FIG. 7 is a schematic diagram of coordinates in group creation according to an embodiment of this application.

FIG. 7 is a schematic diagram of coordinates in group creation according to an embodiment of this application. In some embodiments, that the M interaction objects triggered by the object combination operation are two interaction objects is used as an example for description. As shown in FIG. 7, a coordinate system may be established in a view layer corresponding to the user interaction page, and a vertex O of the view layer may be used as an origin of the coordinate system, that is, coordinates of the vertex O may be denoted as (0, 0). Position information of two trigger points at the beginning of the object combination operation may be denoted as (x1, y2) and (x2, y2). Two interaction objects triggered by the object combination operation may include an interaction object A3 and an interaction object A4. If a region position of a profile photo of the interaction object A3 on the user interaction page includes coordinates (x1, y2), that is, a coverage region of the profile photo of the interaction object A3 on the user interaction page includes coordinates (x1, y2), an initial position of the interaction object A3 (that is, a first initial position, which may also be considered as a center position of the profile photo of the interaction object A3) may be updated to coordinates (x1, y2). If a region position of a profile photo of the interaction object A4 includes coordinates (x2, y2) on the user interaction page, that is, a coverage region of the profile photo of the interaction object A4 includes coordinates (x2, y2) on the user interaction page, an initial position of the interaction object A4 (that is, a second initial position, which may also be considered as a center position of the profile photo of the interaction object A4) may be updated to coordinates (x2, y2).

The interaction object A3 and the interaction object A4 may be moved according to the trajectory determined by the object combination operation, that is, the interaction object A3 and the interaction object A4 may be moved according to trigger points of the object combination operation. If the object combination operation ends, the position information of the two trigger points at the end of the object combination operation may be denoted as (x3, y3) and (x4, y4). In this case, coordinates (x3, y3) may be considered as coordinates of the interaction object A3 at the end of the object combination operation, and coordinates (x4, y4) may be considered as coordinates of the interaction object A4 at the end of the object combination operation. As shown in FIG. 7, by using coordinates (x3, y3) of the interaction object A3 at the end of the object combination operation and coordinates (x4, y4) of the interaction object A4 at the end of the object combination operation, an object spacing distance between the interaction object A3 and the interaction object A4 may be calculated, for example, the object spacing distance $L0=Math.sqrt[(x4-x3)*(x4-x3)+(y3-y4)*(y3-y4)]$, and the Math.sqrt(expression 1) function may return a square root of expression 1.

A destination length threshold (which may be denoted as r1+r2) is calculated according to a region size corresponding to the interaction object A3 (a coverage radius of the profile photo of the interaction object A3 on the user interaction page may be denoted as r1) and a region size corresponding to the interaction object A4 (a coverage radius of the profile photo of the interaction object A4 on the user interaction page may be denoted as r2). When the object spacing distance $L0<r1+r2$, it indicates that the interaction object A3 overlaps the interaction object A4. When $L0>=r1+r2$, it indicates that the interaction object A3 does not overlap the interaction object A4, and the interaction object A3 and the interaction object A4 are returned to the initial positions, for example, the interaction object A3 returns to the first initial position, for example, which may be position (x1, y1), and the interaction object A4 returns to the second initial position, for example, which be position (x2, y2).

In one or more embodiments, when the M interaction objects at the end of the object combination operation meet an overlapping condition, a process in which the M interaction objects are combined into the target group may include: When the moved M interaction objects overlap, a preliminary group may be created by using the M interaction objects, and in this case, a pre-established state may be set for the preliminary group. Further, the preliminary group and creation prompt information associated with the preliminary group may be displayed on the user interaction page, and the preliminary group may be displayed as being in a pre-established state. When the target object performs a confirm operation on the creation prompt information, the computer device may respond to the confirm operation on the creation prompt information, update the preliminary group from the pre-established state to a creation success state, and determine the preliminary group with the creation success state as the target group. More specifically, when the moved M interaction objects overlap, interaction object information of the M interaction objects in the communication application and target object information of the target object in the communication application are obtained. A group creation request that carries the interaction object information and the target object information is sent to the service device, so that when determining that the interaction object information and the target object information conform to identity validity, the service device creates group data associated with the M interaction objects; and group data returned by the service device is received, a preliminary group including the M interaction objects is created according to the group data, and a pre-established state is set for the preliminary group. In some embodiments, after all the M interaction objects triggered by the object combination operation are pinched into the preliminary group, a confirm operation needs to be performed on the preliminary group to confirm a finally formed target group. In this way, the target object may be reminded to confirm members of the newly created preliminary group, so as to avoid a member who is added into the group by mistake, or a group member who is omitted from the group, thereby improving validity of group members.

The interaction object information may include an account identifier corresponding to each of the M interaction objects, or may be other information that is used for uniquely identifying each interaction object. This is not limited to the disclosure of this application. The target object information may include information such as an account identifier, login account information, and a login status of the target object in the communication application. Further, a group creation request carrying the interaction object information and the target object information may be sent to the service device (for example, a background server corresponding to the communication application). After receiving the group creation request, the service device may check identity validity of the target object based on the interaction object information and the target object information. The identity validity herein may be confirming that the target object information is the target object itself, and the M interaction objects and the target object are in a friend relationship. When the target object meets the identity validity, data of one group may be created (that is, group data associated with the M interaction objects is created), and then the group data may be returned to the communication application client. The group data may include but is not limited to information such as group identifier information (for example, a group number, which may be a group number used for uniquely identifying a group), a group status, and a member included in a group. In this case, the group status may be a pre-established state.

After receiving the group data, the communication application client may create, based on the group data, a preliminary group that includes the M interaction objects. The preliminary group may be set to a pre-established state. In this case, the pre-established state is used for indicating that the preliminary group is successfully created. On the user interaction page, a group profile photo of the preliminary group may be displayed. For example, the group profile photo may be referred to as a group bubble, and creation prompt information pops up. The creation prompt information may be used for indicating whether the target object determines to create the group. If the target object chooses to confirm group creation, that is, performs a confirm operation on the creation prompt information, the account identifier of the target object and the group identifier information corresponding to the preliminary group may be used as request parameters, and a group creation confirmation request is sent to the service device. The service device may check the identity validity of the target object according to the request parameters carried in the group creation confirmation request. In this case, the identity validity means that it is confirmed that the account identifier is the user, the group identifier information is pre-established by the current target object, and then the group data corresponding to the preliminary group may be marked in a database of the service device as a group creation success state. Then the group identifier information and group creation success information may be returned to the communication application client. After receiving the group identifier information and the group creation success information that are returned by the service device, the communication application client may display group creation success prompt information (for example, "group creation succeeds") on the user interaction page.

In one embodiment, if the target object chooses to cancel group creation, that is, performs a cancel operation on the creation prompt information, the account identifier of the target object and the group identifier information corresponding to the preliminary group may be used as request parameters, and a group creation cancel request is sent to the service device. The service device may check the identity validity of the target object according to the request parameters carried in the group creation cancel request. In this case, the identity validity means that it is confirmed that the account identifier is the user, the group identifier information is pre-established by the current target object, and then the group data corresponding to the preliminary group may be marked in the database of the service device as a group creation cancel state. Then the group identifier information and group creation cancel information may be returned to the communication application client. After receiving the group identifier information and the group creation cancel information that are returned by the service device, the communication application client may display group creation cancel prompt information (for example, "group creation canceled") on the user interaction page.

In one or more embodiments, when a preliminary group is created by using the M interaction objects, the target object may still continue to change group members in the preliminary group, for example, may continue to pinch the interaction objects to add group members in the preliminary group, or may remove group members in the preliminary group. A manner of adding a group member to the preliminary group is the same as the foregoing process of creating the preliminary group, and details are not described herein again. A process of removing a group member from the preliminary group may include: The target object may perform a trigger operation on the preliminary group displayed on the user interaction page. In this case, the computer device may respond to the trigger operation for the preliminary group, and display a member display page. All group members included in the preliminary group may be displayed on the member display page. The group members included in the preliminary group are associated with the M interaction objects. In response to a member movement operation on the member display page, a group member triggered by the member movement operation is moved to a member removal region on the member display page. A group member in the member removal region is removed from the preliminary group, and a member quantity in the preliminary group displayed on the user interaction page is updated. In some embodiments, the group member in the preliminary group is moved to the member removal region, and the group member in the member removal region may be directly removed from the preliminary group; or after the group member is moved to the member removal region, the group member in the member removal region may be confirmed, and the group member in the member removal region is removed from the preliminary group after a confirm operation for the member removal region is detected. In this way, a case of erroneous deletion can be avoided. By adding the member removal region, a group member added by mistake in the preliminary group can be quickly removed. In this way, efficiency of removing group members can be improved, and controllability of the group members can be improved.

Figure 8:
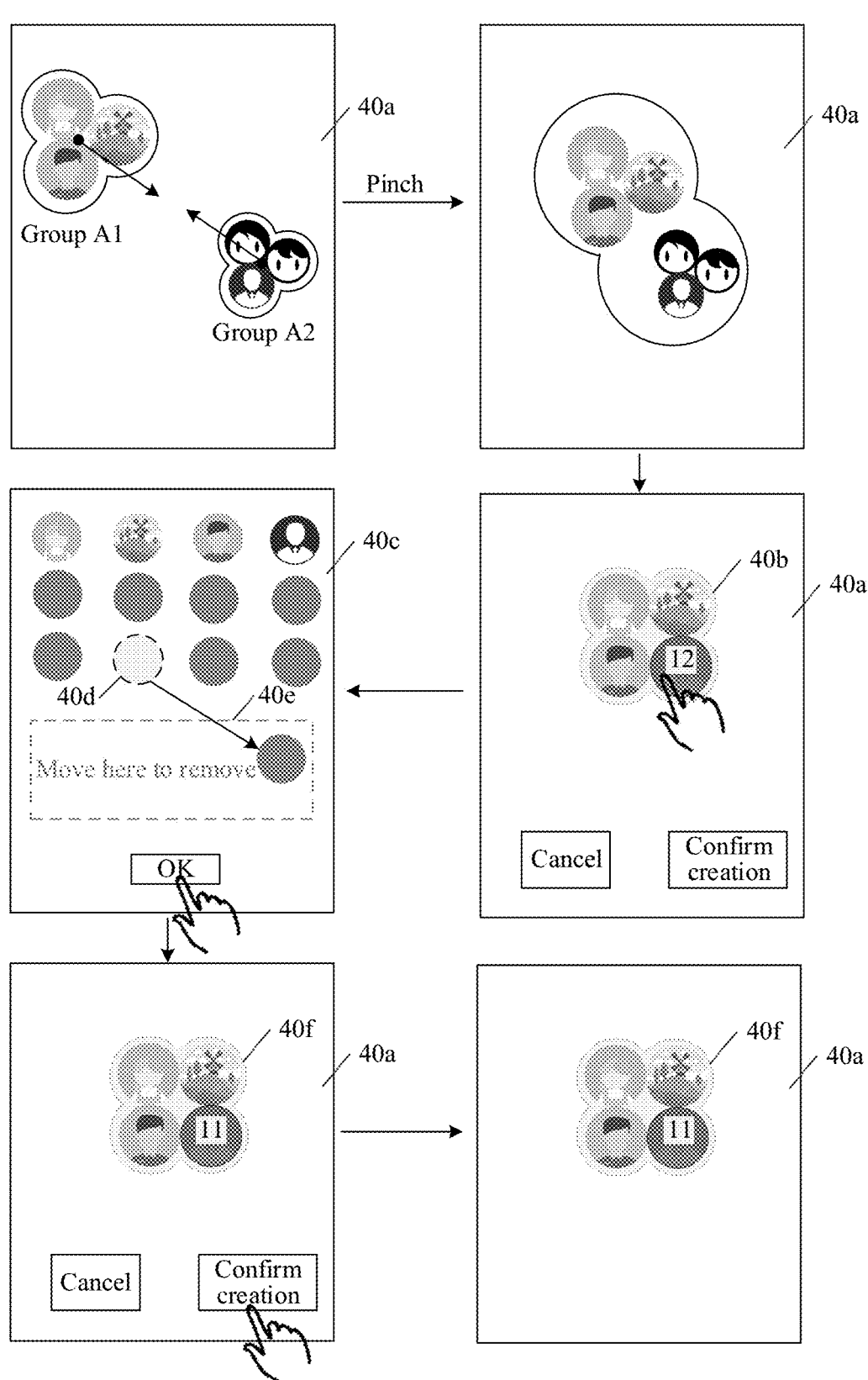
FIG. 8 is a schematic diagram of an interface for removing a group member according to an embodiment of this application.

FIG. 8 is a schematic diagram of an interface for removing a group member according to an embodiment of this application. As shown in FIG. 8, when the target object performs an object combination operation on group A1 and group A2 on a user interaction page 40*a*, bubbles corresponding to group A1 and group A2 may be moved on the user interaction page 40*a*. When bubbles (which may also be understood as group profile photos) respectively corresponding to the moved group A1 and the moved group A2 overlap, a preliminary group 40*b* may be created by using group A1 and group A2, and a group bubble corresponding to the preliminary group 40*b* is displayed on the user interaction page 40*a*. In this case, creation prompt information for the preliminary group 40*b* may be further displayed on the user interaction page 40*a* (as shown in FIG. 8, the creation prompt information may include a "Cancel" control and a "Confirm creation" control). The group bubble corresponding to the preliminary group 40*b* may be displayed in a combination form of i+1. The combination form of i+1 may indicate that the group bubble may include i+1 positions, where i positions may be used for displaying profile photos of any i group members in the preliminary group, and one position may be used for displaying a total quantity of group members in the preliminary group (for example, the total quantity of group members may be 12). When the total quantity of group members in the preliminary group is less than 3, i in this case may be used for indicating the total quantity of group members. When the total quantity of group members in the preliminary group is greater than or equal to 3, i in this case may be 3. Certainly, the combination form of i+1 herein is merely an example for description. The group bubble in some embodiments may be represented in another form. This is not limited to the disclosure of this application.

When the target object performs a trigger operation on the preliminary group 40*b* on the user interaction page 40*a* (for example, may tap any position of the group bubble corresponding to the preliminary group 40*b*), a member display page 40*c* may be displayed. The member display page 40*c* may be used for displaying all group members included in the preliminary group 40*b*. The group member displayed on the member display page 40*c* may use a profile photo, a nickname, or other information used for representing the group member. This is not limited to the disclosure of this application. In addition, the member display page 40*c* may further include a member removal region 40*e*. The member removal region 40*e* may always be displayed on the member display page 40*c*, or the member removal region 40*e* may be displayed on the member display page 40*c* only when a member movement operation is triggered by the target object. When no member movement operation is triggered, the member removal region 40*e* may be temporarily hidden. A presentation manner of the member removal region 40*e* is not limited in this application.

When the target object performs a member movement operation on the group member 40*d* in the preliminary group 40*b*, the computer device may move a group member 40*d* to the member removal region 40*e* in response to the member movement operation for the group member 40*d*. When the member removal region 40*e* includes a group member, an OK control may be added to the member display page 40*c*. Further, a trigger operation may be performed on the newly added OK control, to remove the group member 40*d* from the preliminary group 40*b*, and the user interaction page 40*a* is returned. In this case, the preliminary group 40*b* is updated to a preliminary group 40*f*, and the total quantity of group members of the preliminary group 40*f* is updated from 12 to 11. Certainly, the target object may alternatively remove multiple group members from the preliminary group 40*b* at a time, which is not limited in this application.

Further, the target object may perform a trigger operation on the "Confirm creation" control on the user interaction page 40*a*, so that the preliminary group 40*f* may be determined as a newly created target group. In one embodiment, the target object may alternatively perform a trigger operation on the "Cancel" control on the user interaction page 40*a*, so as to cancel the preliminary group 40*f*, that is, dissolve group members in the preliminary group 40*f*.

In one embodiment, a process of removing a group member from the preliminary group may further include: The target object may perform a trigger operation on the preliminary group displayed on the user interaction page. In this case, the computer device may respond to the trigger operation for the preliminary group, display the member display page, and display, on the member display page, all group members included in the preliminary group, where the group members included in the preliminary group are associated with the M interaction objects. When the target object performs a long press operation on any group member in the member display page (when a time period of pressing a terminal screen by the target object exceeds preset duration, it may be referred to as a long press operation, where the preset duration herein may be set to 1 second or 2 seconds, and the long press operation herein may also be referred to as a member removal operation), the computer device may respond to the long press operation for the preliminary group, and remove a group member triggered by the long press operation from the preliminary group. In some embodiments, by performing a long press operation on a group member in a preliminary group, a group member that is erroneously added to the preliminary group can be removed, thereby improving efficiency of removing the group member and facilitating control of the group member. The long press operation herein is merely an example for description in the embodiment of this application. In some embodiments, another gesture operation may alternatively be used for removing a group member. For example, a display region of a corresponding group member on the terminal screen is tapped or double-tapped by using a knuckle. This is not limited to the disclosure of this application.

Figure 9:
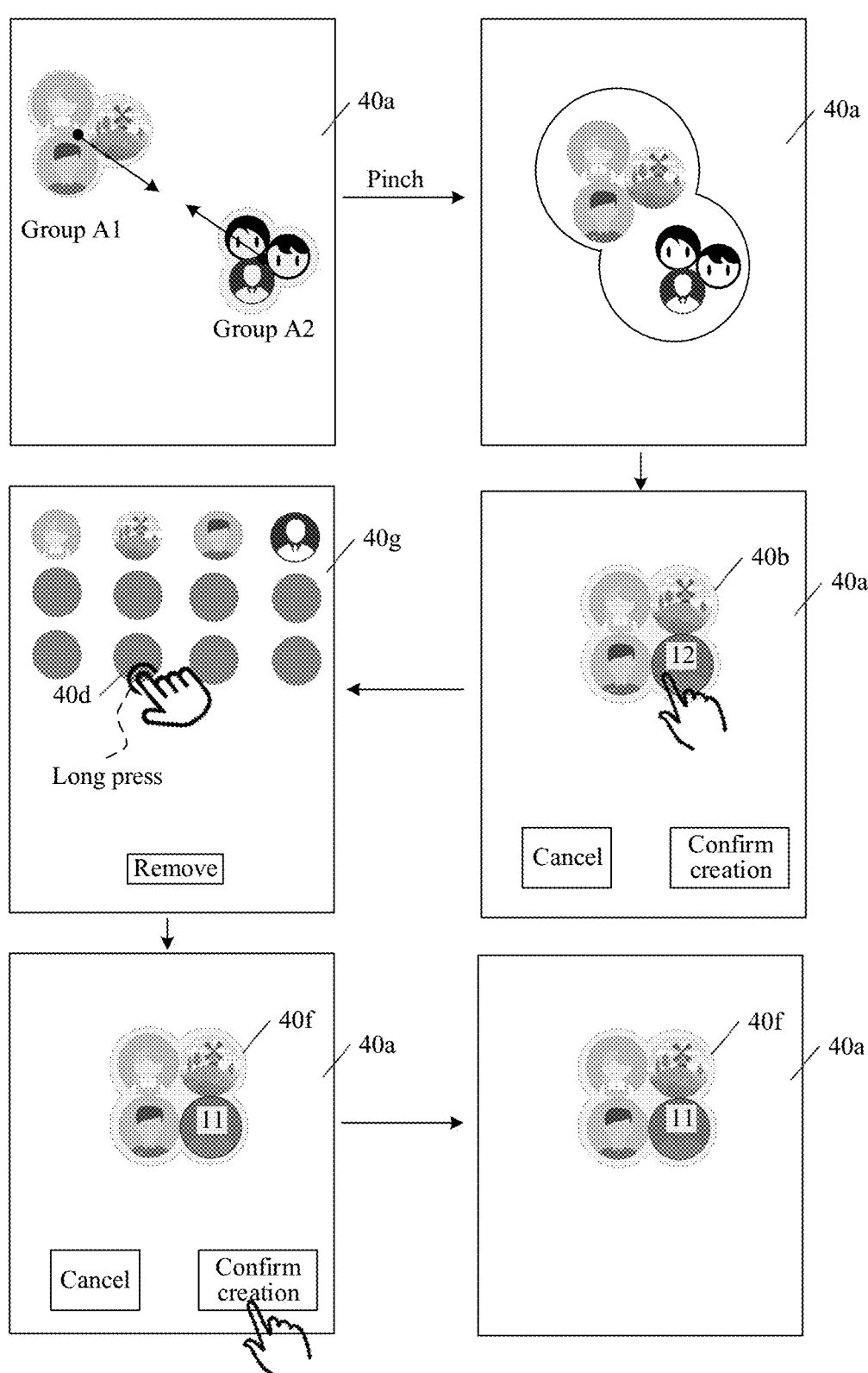
FIG. 9 is a schematic diagram of another interface for removing a group member according to an embodiment of this application.

FIG. 9 is a schematic diagram of another interface for removing a group member according to an embodiment of this application. For a creation process and a presentation manner of a preliminary group 40*b* shown in FIG. 9, refer to descriptions in the foregoing embodiment corresponding to FIG. 8. Details are not described herein again. When the target object performs a trigger operation on the preliminary group 40*b*, a member display page 40*g* may be displayed, and the member display page 40*g* may be used for displaying all group members included in the preliminary group 40*b*. When the target object performs a long press operation on a group member 40*d* in the preliminary group 40*b*, a "Remove" control may be displayed on the member display page 40*g*, and then a trigger operation may be performed on the "Remove" control to remove the group member 40*d* from the preliminary group 40*b*, and the user interaction page 40*a* is returned. In this case, the preliminary group 40*b* is updated to a preliminary group 40*f*, and a total quantity of group members of the preliminary group 40*f* is updated from 12 to 11. For a subsequent operation of the target object on the preliminary group 40*f*, refer to related descriptions in the embodiment corresponding to FIG. 8. Details are not described herein again.

In one embodiment, after a target group is successfully created, a group member in the target group may also be removed in any manner of the foregoing embodiment corresponding to FIG. 8 or FIG. 9, or the target group and another interaction object may be continuously pinched, so as to add a group member to the target group. For this, refer to the foregoing related descriptions for the preliminary group, and details are not described herein again.

In one or more embodiments, for each interaction object displayed on the user interaction page, a display region of each interaction object on the user interaction page may be determined according to a type of the interaction object. According to the type of the interaction object, the user interaction page may be divided into multiple regions, one region may display interaction objects of the same type, and different regions are used for displaying different types of interaction objects. For example, interaction objects may include a friend (or a single user) and a group, that is, types of interaction objects include a friend type and a group type. The user interaction page may be divided into two regions, denoted as a first region and a second region. The first region may be used for displaying a friend corresponding to the target object, and the second region may be used for displaying a group to which the target object is added. For a manner of determining a friend display sequence in the first region and a group display sequence in the second region, refer to the manner of determining the display sequence of the interaction objects in the foregoing list form. Details are not described herein again. In one embodiment, the friend of the target object and the group to which the target object is added may be displayed on the user interaction page in a fusion manner, that is, the friend and the group may be displayed on the user interaction page in a cross manner. For display manners of the friend and the group on the user interaction page, refer to the display manner of each interaction object in the foregoing list form, and details are not described herein again.

In one or more embodiments, the user interaction page may further include a third-party message other than interaction objects (including a friend and a group), and the third-party message may include but is not limited to a push message from an official account, a mini program, an advertisement, a friend space, and news. This is not limited to the disclosure of this application. The user interaction page may be divided into an object region and a push message region. The object region may be used for displaying an interaction object of the target object in the communication page. The push message region may be used for displaying a third-party message pushed by the communication application for the target object. The push message region may be a sub-region on the user interaction page, or may be a sub-page independently displayed on the user interaction page. A presentation manner of the third-party message in the push message region is associated with a layout form of the user interaction page. For example, when the layout form of the user interaction page is a list form, the third-party message is presented in the list form. When the layout form of the user interaction page is a bubble form, the third-party message is presented in the bubble form. By displaying the interaction object and the third-party message separately on the user interaction page, it is helpful to quickly determine group members when the target object creates a target group.

In the push message region of the user interaction page, all third-party messages pushed by the communication application for the target object may be displayed in the display manner of each interaction object in the foregoing list form, for example, may be displayed according to information such as a latest receiving time of the third-party message, a starred contact, a name alphabetical order of a message pusher, and a color of a profile photo. Alternatively, the push message region of the user interaction page may further provide a sorting function, and the target object may select a proper sorting manner to display the third-party message. Alternatively, the third-party message that is pushed by the communication application for the target object may be displayed in the push message region according to a type of the third-party message. For example, the push message region may be divided into multiple sub-regions, one sub-region is used for displaying the same type of third-party messages, and different sub-regions are used for displaying different types of third-party messages. For example, the push message region may be divided into a sub-region q1, a sub-region q2, and a sub-region q3. The sub-region q1 is used for displaying an official account, the sub-region q2 may be used for displaying a mini program, and the sub-region q3 may be used for displaying a push message such as news and an advertisement. In one embodiment, the interaction object and the third-party message corresponding to the target object may be displayed on the user interaction page in a fusion manner, that is, the interaction object and the third-party message may be displayed on the user interaction page in a cross manner. Presentation manners of the interaction object and the third-party message on the user interaction page are not limited in this application.

In some embodiments, for interaction objects that are displayed on the user interaction page and that are associated with the target object, an object combination operation may be performed on two or more interaction objects on the user interaction page, so that a new target group can be quickly established. In this way, creation operations of the target group can be reduced, thereby improving creation efficiency of the target group. In addition, in a process of creating the target group, group members that join the target group can be effectively controlled, thereby improving management efficiency of the target group.

FIG. 10 is a schematic flowchart of another group processing method according to an embodiment of this application. It may be understood that the group processing method is performed by a computer device, and the computer device may be a user terminal (for example, the user terminal 10*a* shown in FIG. 1) or a server (the server 10*d* shown in FIG. 1). This is not limited to the disclosure of this application. The group processing method may include the following S201 to S204. That a profile photo is used as an object identifier is used for description.

S201: Display a user interaction page associated with a target object, the user interaction page including an interaction object of the target object in a communication application, and the interaction object being dispersedly displayed in a form of a profile photo on the user interaction page.

S202: Create, in response to an object combination operation on the user interaction page, a target group based on M interaction objects triggered by the object combination operation, and display the target group on the user interaction page, M being an integer greater than 1.

For a specific implementation process of S201 and S202, refer to descriptions in the embodiment corresponding to FIG. 3. Details are not described herein again.

S203: Obtain, in response to a group dissolution operation for the target group, trigger initial positions and trigger destination positions of K dissolution trigger points determined by the group dissolution operation in the communication page, K being an integer greater than 1.

Specifically, for the target group displayed on the user interaction page, the target object may quickly dissolve the target group by using an expand gesture. The expand gesture herein may be referred to as a group dissolution operation. When the target object performs a group dissolution operation on the target group, in response to the group dissolution operation for the target group, K dissolution trigger points determined by the group dissolution operation may be obtained. K herein may be an integer greater than 1, for example, a minimum value of K is 2. Further, trigger initial positions and trigger destination positions of the K dissolution trigger points in the communication page may be obtained, where the trigger initial position may refer to position information of each dissolution trigger point in the K dissolution trigger points at the beginning of the group dissolution operation, and the trigger destination position may refer to position information of each dissolution trigger point in the K dissolution trigger points at the end of the group dissolution operation.

If the target object performs a trigger operation on the target group on the user interaction page, and the trigger operation is corresponding to only one trigger point, it may be determined that the trigger operation performed by the current target object on the target group is not a group dissolution operation. If a trigger operation performed by the target object on the target group is corresponding to two or more trigger points (for example, which may be denoted as K trigger points), and trigger initial positions of at least two trigger points in the K trigger points are within a display region range of the target group (for example, a group bubble corresponding to the target group is within a coverage range on the user interaction page), it may be determined that the trigger operation performed by the target object on the target group is a dissolve operation, and in this case, the K trigger points may be referred to as dissolution trigger points. If the trigger initial positions of the K trigger points are not within the display region range of the target group, or a trigger initial position of only one trigger point in the K trigger points is within the display region range of the target group, it may be determined that the trigger operation performed by the current target object on the target object is not a group dissolution operation.

S204: Dissolve the target group in a case that a distance between the trigger initial positions corresponding to the K dissolution trigger points is less than a distance between the trigger destination positions corresponding to the K dissolution trigger points, and display dissolution success prompt information associated with the target group.

Specifically, when a distance between the trigger initial positions corresponding to the K dissolution trigger points is less than a distance between the trigger destination positions corresponding to the K dissolution trigger points, dissolution prompt information for the target group is displayed on the user interaction page. The target object may perform a confirm operation on the dissolution prompt information. In this case, the computer device may dissolve the target group in response to the confirm operation on the dissolution prompt information, and display, on the user interaction page, dissolution success prompt information associated with the target group.

When the target object performs a group dissolution operation on the target group, position information of K dissolution trigger points determined by the group dissolution operation may be obtained in real time. That is, in a process in which the target object performs the group dissolution operation, the position information of the K dissolution trigger points is updated in real time according to a trajectory determined by the group dissolution operation. When the target object starts to perform the group dissolution operation, the position information of the K dissolution trigger points may be referred to as trigger initial positions. When the target object ends performing the group dissolution operation, the position information of the K dissolution trigger points may be referred to as trigger destination positions.

When the distance between the trigger initial positions corresponding to the K dissolution trigger points is less than the distance between the trigger destination positions corresponding to the K dissolution trigger points, the target group may be set to a pre-dissolved state. The pre-dissolved state herein may be used for indicating that the target group is in an intermediate state between an available state (a normal use state when the target group is not dissolved) and an unavailable state (a stop use state after the target group is successfully dissolved). In this case, dissolution prompt information associated with the target group may be displayed on the user interaction page. Further, a trigger operation may be performed on the dissolution prompt information to confirm dissolution of the target group, and dissolution success prompt information is displayed on the user interaction page. By performing a group dissolution operation on the target group by using an expand gesture, the target group can be quickly dissolved, thereby improving group dissolution efficiency.

FIG. 11 is a schematic diagram of group dissolution according to an embodiment of this application. In some embodiments, that a quantity K of dissolution trigger points determined by a group dissolution operation is equal to 2 (that is, two dissolution trigger points) is used as an example for description. As shown in FIG. 11, after the target object triggers a group dissolution operation (an expand gesture) on the target group on the user interaction page, two dissolution trigger points (black dots shown in FIG. 11) of the group dissolution operation on the user interaction page may be obtained, and initial trigger positions of the two dissolution trigger points when the target object starts to perform the group dissolution operation are obtained. The initial trigger position may be considered as position information of the dissolution trigger point when the target object starts to perform the group dissolution operation, and the initial trigger positions of the two dissolution trigger points are within a display region range of the target group on the user interaction page.

In a process in which the target object performs the group dissolution operation on the target group, that is, when the target object performs the expand gesture on the target group, position information of the two dissolution trigger points determined by the group dissolution operation may be updated in real time. When the group dissolution operation is in an unreleased state (that is, a state in which the target object has not ended the group dissolution operation), and a distance between the two dissolution trigger points after the position update increases with the group dissolution operation, dissolution prompt information may be displayed (for example, "release the hand to dissolve the group"). In this case, the target object may end the group dissolution operation, that is, end the expand gesture, and release the touch on the target group. In this case, the release operation of the target object on the target group may be considered as a confirm operation performed by the target object on the dissolution prompt information, so that the target group can be directly dissolved, and dissolution success prompt information (for example, "successfully dissolved") for the target group is displayed on the user interaction page.

In one embodiment, the dissolution process of the target group shown in FIG. 11 may further include: obtaining trigger initial positions of two dissolution trigger points (two trigger points determined by the group dissolution operation) at the beginning of the group dissolution operation, and trigger destination positions at the end of the group dissolution operation, calculating a distance (which may be denoted as L1) between the two dissolution trigger points at the beginning of the group dissolution operation based on the trigger initial positions of the two dissolution trigger points, and calculating a distance (which may be denoted as L2) between the two dissolution trigger points at the end of the group dissolution operation based on the trigger destination positions of the two dissolution trigger points; and when L1 is less than L2, displaying dissolution prompt information on the user interaction page (for example, the dissolution prompt information in this case may be "Confirm to dissolve the group"). When the target object chooses to confirm to dissolve the target group, the target group may be directly dissolved, the target group is canceled to be displayed on the user interaction page, and each group member in the target group is independently displayed.

In one or more embodiments, when the distance between the trigger initial positions corresponding to the K dissolution trigger points is less than the distance between the trigger destination positions corresponding to the K dissolution trigger points, the target group may be temporarily dissolved, and cancel prompt information associated with the dissolved target group may be displayed on the user interaction page. If no cancel operation is detected for the cancel prompt information, and display duration of the cancel prompt information on the user interaction page is greater than or equal to a duration threshold, dissolution success prompt information associated with the target group is displayed; or if the target object does not perform a trigger operation on the cancel prompt information within the duration threshold, it may be considered that the target object has determined to dissolve the target group. When the target object performs a trigger operation on the cancel prompt information within the duration threshold, the computer device may cancel the group dissolution operation on the target group in response to a confirm operation on the cancel prompt information, and recover the target group. For example, when the target object performs a trigger operation on the cancel prompt information within the duration threshold, it indicates that the target object may dissolve the target group due to an operation error, and therefore, the group dissolution operation on the target group may be canceled in time, so as to recover the target group. In this way, a group dissolution situation caused by an operation error can be avoided.

Figure 12:
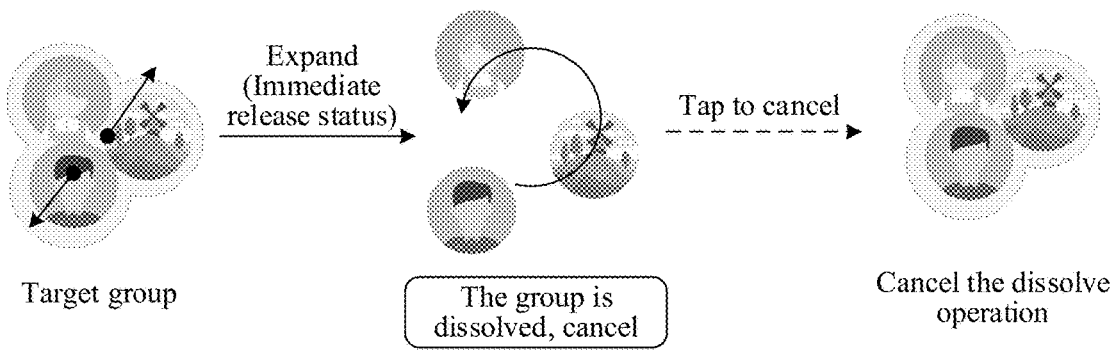
FIG. 12 is a schematic diagram of another group dissolution according to an embodiment of this application.

FIG. 12 is a schematic diagram of another group dissolution according to an embodiment of this application. Some embodiments is described by using an example in which a quantity K of dissolution trigger points determined by a group dissolution operation is equal to 2 (that is, two dissolution trigger points). As shown in FIG. 12, if the target object triggers a group dissolution operation (an expand gesture) on a target group on the user interaction page, and ends the group dissolution operation, the target group may be temporarily dissolved, and cancel prompt information (for example, "the group is dissolved, cancel") associated with the dissolved target group may be displayed on the user interaction page. When the target object performs a trigger operation on the cancel prompt information displayed on the user interaction page, the dissolved target group may be recovered. When the target object does not perform a trigger operation on the cancel prompt information within a preset duration threshold, it indicates that the group dissolution operation on the target group is an effective operation, and the target object determines to dissolve the target object, and does not need to cancel the group dissolution operation on the target group.

Figure 13:
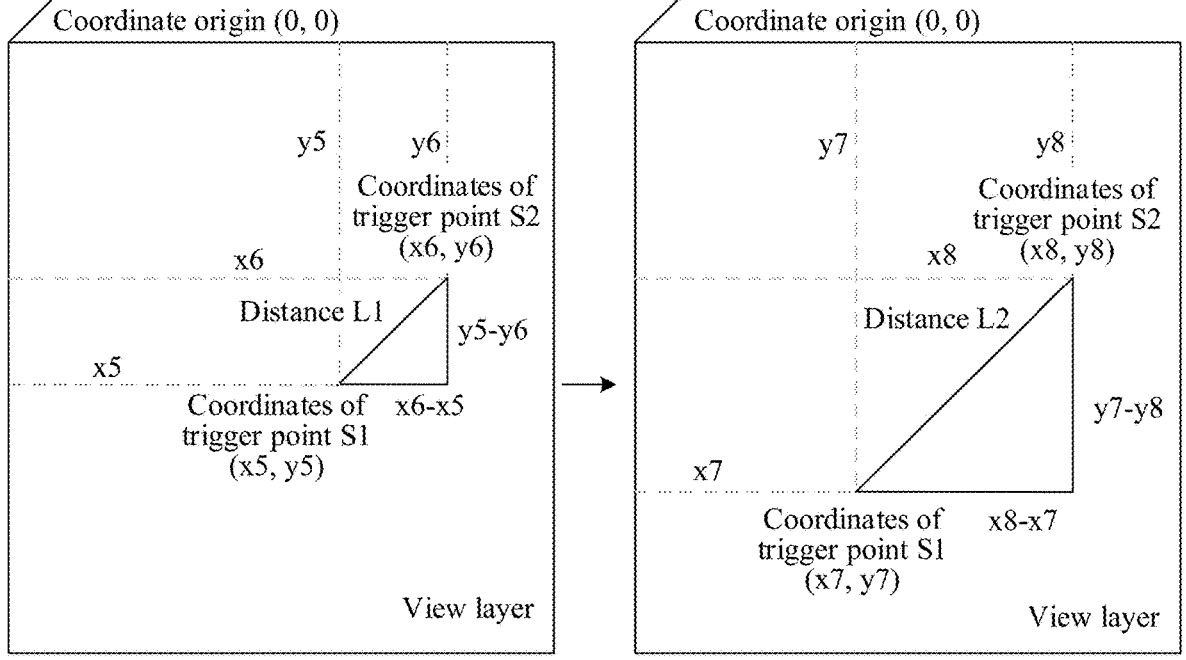
FIG. 13 is a schematic diagram of coordinates in group dissolution according to an embodiment of this application.

The following uses an example in which the quantity K of dissolution trigger points determined by the group dissolution operation is equal to 2 to specifically describe a distance between K dissolution trigger points at the beginning of the group dissolution operation and a distance between the K dissolution trigger points at the end of the group dissolution operation. FIG. 13 is a schematic diagram of coordinates in group dissolution according to an embodiment of this application. A group dissolution scenario shown in FIG. 13 and the group creation scenario shown in FIG. 7 may use the same coordinate system. Details are not described herein again. In the group dissolution scenario, after the target object triggers a group dissolution operation on a target group on the user interaction page, two dissolution trigger points determined by the group dissolution operation on the user interaction page include a trigger point S1 and a trigger point S2. A trigger initial position of the trigger point S1 at the beginning of the group dissolution operation may be represented as (x5, y5), and a trigger initial position of the trigger point S2 at the beginning of the group dissolution operation may be represented as (x6, y6). Based on the trigger initial position (x5, y5) corresponding to the trigger point S1 and the trigger initial position (x6, y6) corresponding to the trigger point S2, a distance L1 between the trigger point S1 and the trigger point S2 at the beginning of the group dissolution operation may be calculated, where the distance $L1=\text{Math.sqrt}[(x6-x5)*(x6-x5)+(y5-y6)*(y5-y6)]$.

When the target object ends the group dissolution operation, a trigger destination position of the trigger point S1 at the end of the group dissolution operation may be represented as (x7, y7), and a trigger destination position of the trigger point S2 at the end of the group dissolution operation may be represented as (x8, y8). Based on the trigger destination position (x7, y7) corresponding to the trigger point S1 and the trigger destination position (x8, y8) corresponding to the trigger point S2, a distance L2 between the trigger point S1 and the trigger point S2 at the end of the group dissolution operation may be calculated, where the distance $L2=\text{Math.sqrt}[(x8-x7)*(x8-x7)+(y7-y8)*(y7-y8)]$.

When the distance L2 is greater than the distance L1, it may indicate that the current group dissolution operation may be used for indicating to dissolve the target group. For example, confirmation information about whether to dissolve the target group pops up. After the target object chooses to confirm to dissolve the target group, the target group may be dissolved. When the distance L2 is less than or equal to the distance L1, it indicates that the current group dissolution operation is essentially a pinch gesture, and no processing may be performed on the target group.

In one or more embodiments, in the group dissolution scenario, the communication application client installed in the computer device needs to interact with a service device corresponding to the communication application (for example, a background server corresponding to the communication application). The following describes an interaction process between the communication application client and the service device in the group dissolution scenario. Specifically, when the distance between the trigger initial positions corresponding to the K dissolution trigger points is less than the distance between the trigger destination positions corresponding to the K dissolution trigger points, group identifier information corresponding to the target group and target object information corresponding to the target object may be obtained. A group dissolution request that carries the group identifier information and the target object information is sent to the service device, so that when determining that the target object information conforms to identity validity, the service device generates group dissolution information for group data corresponding to the group identifier information. The group dissolution information returned by the service device is received, the target group is dissolved based on the group dissolution information, and dissolution success prompt information associated with the target group is displayed on the user interaction page.

The group identifier information may include a group identifier (for example, a group number) corresponding to the target group, and the target object information may include an account identifier used for representing an identity of the target object, and certainly, may further include information such as login account information and a login status. This is not limited to the disclosure of this application. Further, a group dissolution request that carries the group identifier information and the target object information may be sent to the service device. After receiving the group dissolution request, the service device may check identity validity of the target object based on the group identifier information and the target object information. The identity validity herein may refer to determining that the target object information is the target object itself, and that the target object has permission to dissolve the target group. When the target object meets identity validity, it indicates that the target object information is the target object itself, and the target object has the permission to dissolve the target group, for example, the target object is a creator of the target group. When the target object does not meet identity validity, it indicates that the target object information is incorrect, or the target object does not have the permission to dissolve the target group, for example, the target object is not the creator of the target group.

After determining identity validity of the target object, the service device may search a database for the group data corresponding to the target group according to the group identifier information, and mark an original available state of the group data as "false" (which may be considered as an unavailable state). The "false" may be used for indicating that the target group is dissolved, and return the unavailable state of the group data corresponding to the target group and group dissolution success information to the communication application client in the computer device as group dissolution information. After receiving the group dissolution information, the communication application client may dissolve the target group on the user interaction page, and independently display group members in the target group in the display region range in which the target group is located, for example, display contact bubble user interfaces (UI) corresponding to the group members in the target group.

Figure 14:
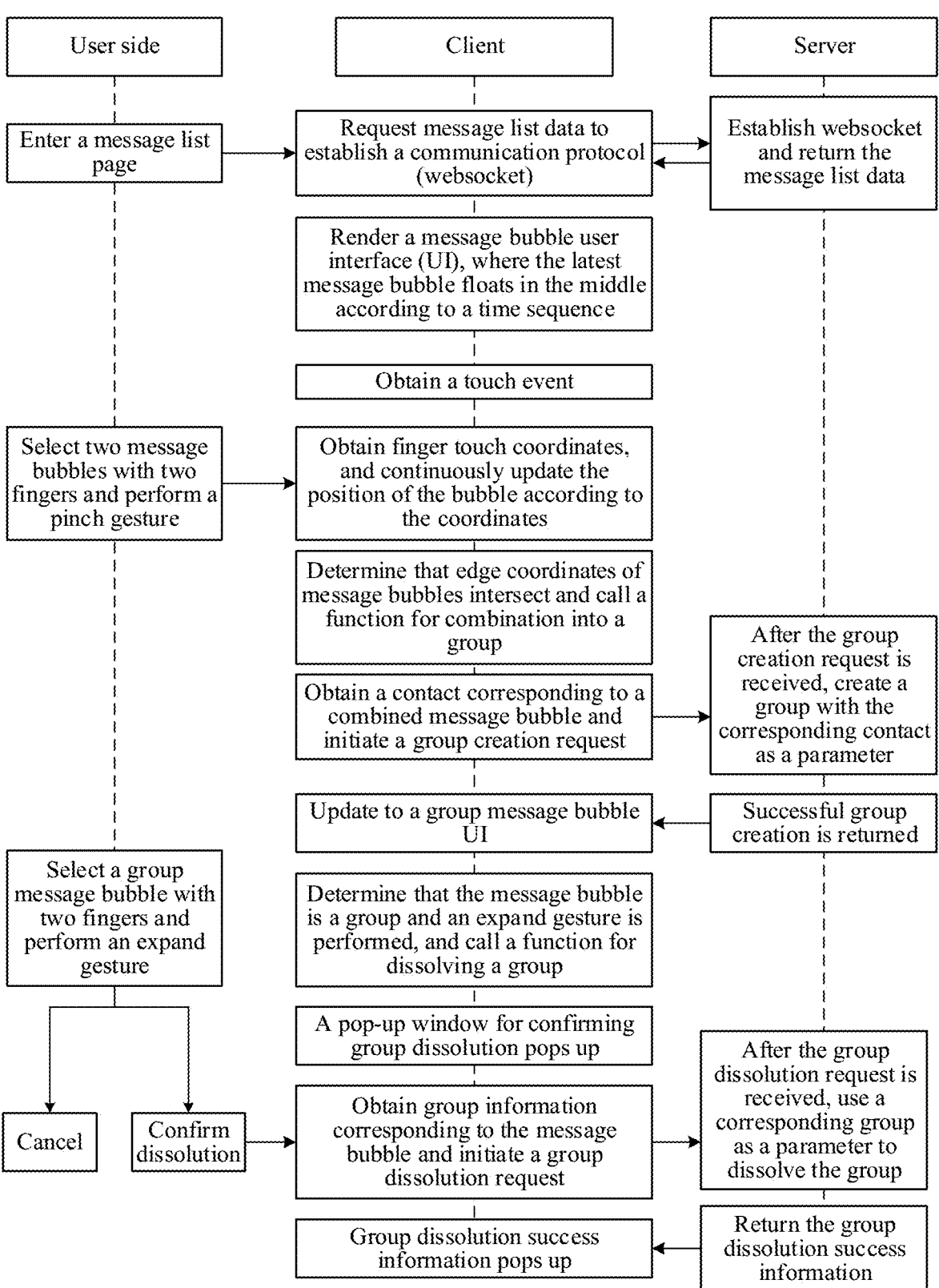
FIG. 14 is a schematic flowchart of group processing according to an embodiment of this application.

FIG. 14 is a schematic flowchart of group processing according to an embodiment of this application. As shown in FIG. 14, the group processing procedure involves interaction among a user side (a target object), a client (a communication application client corresponding to a communication application installed in a computer device, hereinafter referred to as a client for ease of understanding), and a server (a service device, such as a background server corresponding to the communication application). The group processing procedure may include a group creation procedure and a group dissolution procedure.

(1) Group Creation Procedure

The target object may log in to the communication application by using pre-registered account information, and enter a message list page (user interaction page). In this case, the client may request message list data from the server, and request to establish a communication connection to the server. After receiving the request sent by the client, the server may establish a websocket (a communication protocol) between the client and the server, and return message list data to the client by using the websocket.

After receiving the message list data returned by the server, the client may determine an interaction object corresponding to the target object, render, based on the message list data, a message bubble UI (that is, a presentation manner of each interaction object in the message list page) corresponding to each interaction object, and may determine, according to an interaction time between each interaction object and the target object, a display sequence of the message bubble UI corresponding to each interaction object in the message list page. For example, the latest message bubble UI may be displayed at a central point position in the message list page, that is, the message bubble UI of the interaction object with the latest interaction time may be displayed at the central point position in the message list page.

The client may obtain a touch event of the target object in the message list page (which may be understood as a trigger operation of the target object in the message list page). When the target object triggers a touch event in the message list page, a quantity of fingers in the message list page (which may be considered as a quantity N of trigger points determined by the touch event) may be determined. When the quantity of fingers is greater than or equal to 2, it indicates that the target object triggers a gesture to start. For ease of understanding, the following describes the group creation process by assuming that the quantity of fingers is 2.

The client may obtain coordinates (x1, y1) and (x2, y2) of trigger points of the two fingers on the message list page, that is, position information of the two trigger points determined by the touch event. The client may further obtain coordinate information (position information) of a message bubble corresponding to each interaction object in the message list page, and compare and find two message bubbles that overlap with the coordinates of the two trigger points. If the message list page has no or has less than two message bubbles that overlap with the coordinates of the trigger points, it indicates that the gesture triggered by the current target object is not a pinch gesture (an object combination operation) used for creating a group. If the message list page has two message bubbles that overlap with the coordinates of the trigger points, it indicates that the gesture triggered by the current target object is a pinch gesture (an object combination operation) used for creating a group, and therefore, initial position information (popX11, popY11) and (popX22, popY22) of the two message bubbles may be obtained. The two message bubbles herein may be considered as two interaction objects triggered by the pinch gesture, and (popX11, popY11) and (popX22, popY22) may be referred to as initial position information of the two interaction objects.

For example, if the target object selects two message bubbles in the message list page by using two fingers, and performs a gesture pinch action (an object combination operation) on the two message bubbles, the client may obtain finger touch coordinates (that is, position information of combination trigger points determined by the pinch gesture). The client may record updated trigger point coordinates based on a touch movement event indicated by the pinch gesture. In addition, the coordinates of the two message bubbles may be updated to the trigger point coordinates, that is, the positions of the two message bubbles are updated, so that the message bubbles can move along with the trigger points of the pinch gesture.

When the touch movement event indicated by the pinch gesture ends, that is, the target object ends the object combination operation, coordinates (destination positions) of the trigger points at the end of the touch movement event may be obtained, which may be denoted as (x3, y3) and (x4, y4), and further, a distance (an object spacing distance, which may be denoted as L0) between the two trigger points at the end of the touch movement event may be calculated based on coordinates (x3, y3) and (x4, y4), which may be considered as a distance between center points of the two message bubbles. After the gesture starts, when the quantity of fingers in the message list page is less than 2, it may be determined that the pinch gesture ends. For a calculation manner of the object spacing distance L0, refer to related descriptions in the foregoing embodiment corresponding to FIG. 7. Details are not described herein again.

Further, whether edges of the two message bubbles overlap, or whether edge coordinates of the two message bubbles intersect may be determined according to the object spacing distance L0. Radii of the two message bubbles are respectively r1 and r2 (region size). If r1+r2>L0, it indicates that the two message bubbles overlap. If r1+r2<=L0, it indicates that the two message bubbles do not overlap, and the bubbles are automatically moved back to the initial positions (popX11, popY11) and (popX22, popY22).

If the two message bubbles overlap at the end of the touch movement event, that is, the edge coordinates of the two message bubbles intersect, a new group may be created by using interaction objects corresponding to the two message bubbles. Logic of creating the group may include: When the edge coordinates of the two message bubbles intersect, which may be understood as that all or some regions of the two message bubbles overlap, a function for combining into a group may be invoked in the communication application, and contact information (interaction object information) corresponding to the two message bubbles and an account identifier corresponding to the target object may be obtained as request parameters, and user information used for verifying a login status (login information of the target object stored in the client) is carried to send a group creation request (that is, a group establishment request) to the server.

The account identifier and the user information used for verifying the login status may be collectively referred to as target object information.

After receiving the group creation request, the server may check identity validity of the target object according to the target object information (the identity validity herein may be confirming that it is the target object itself, and the active objects (contacts) corresponding to the two message bubbles are in a friend relationship with the target object). When the target object meets identity validity, data of one group (that is, group data) may be created in the database of the server. The group data includes a name of a newly created group (a preliminary group), a group identifier, and a pre-established state marked for a newly created group (an intermediate state in which data information of the newly created group is available, but group creation is not confirmed) being true. Then, the server may return, to the client, group data corresponding to the newly established group and group pre-established success information.

After receiving the group data corresponding to the newly created group and the group pre-established success information that are returned by the server, the client may update current two message bubble UIs to a newly-created-group message bubble UI, and pop up a prompt box, indicating whether to create a group. The prompt box in this case may contain creation prompt information (for example, "Confirm to create a group").

If the target object chooses to confirm to create the group, the account identifier corresponding to the current target object and group identifier information (for example, a group number) corresponding to the newly created group are used as request parameters, to send a request for confirming group creation to the server. The server checks, according to the information carried in the request for confirming group creation, identity validity of the target object (the identity validity herein means confirming that it is the target object itself, and the group identifier information is pre-established by the current target object), and then marks, in the database, the group data corresponding to the newly created group to be in a group creation success state, and returns the group identifier information and group creation success information to the client. After receiving the group identifier information and the group creation success information that are returned by the server, the client prompts on the user interaction page of the client that group creation succeeds. In this case, the newly created group may be referred to as the target group.

If the user chooses to cancel group creation, the account identifier corresponding to the target object and the group identifier information corresponding to the newly created group are used as request parameters, to send a request for canceling group creation to the server. The server checks, according to the information carried in the request for canceling group creation, identity validity of the target object (the identity validity herein may mean confirming that it is the target object itself, and the group identifier information is pre-established by the current target object), and then marks, in the database, the group data corresponding to the newly created group to be in a group creation canceled state, and returns the group identifier information and group creation canceled information to the client. After receiving the group identifier information and the group creation canceled information that are returned by the server, the client may prompt on the user interaction page of the client that group creation is canceled.

(2) Group Dissolution Procedure

The client may obtain a touch event of the target object in the message list page. When the target object triggers a touch event in the message list page, a quantity of fingers in the message list page (which may be considered as a quantity K of trigger points determined by the touch event) may be determined. When the quantity of fingers is greater than or equal to 2, it indicates that the target object triggers a gesture to start. For ease of understanding, the following describes the group dissolution process by assuming that the quantity of fingers is 2.

The client may obtain coordinates (x3, y3) and (x4, y4) of trigger points of the two fingers on the message list page, that is, trigger initial positions of the two trigger points determined by the touch event. Further, a distance L1 between the two trigger points at the beginning of the gesture may be calculated based on coordinates (x3, y3) and (x4, y4) of the trigger points. For a calculation manner of the distance L1, refer to related descriptions in the foregoing embodiment corresponding to FIG. 13. Details are not described herein again.

Message bubble coordinates in the current message list page may be obtained, and group message bubbles that overlap coordinates (x3, y3) and (x4, y4) of the two trigger points may be found by means of comparison. If the message list page has group message bubbles that overlap coordinates (x3, y3) and (x4, y4) of the two trigger points, it may be determined that a gesture triggered by the target object is an expand gesture (a group dissolution operation) used for dissolving a group. If the message list page does not have group message bubbles that overlap coordinates (x3, y3) and (x4, y4) of the two trigger points, it may be determined that the gesture triggered by the target object is not an expand gesture used for dissolving a group. If it is determined that a message bubble triggered by the target object is a group, and the gesture is an expand gesture, a function of dissolving a group may be invoked, and the function of dissolving a group may be used for popping up a pop-up window for confirming group dissolution.

The client may record updated trigger point coordinates based on a touch movement event indicated by the expand gesture. When the touch movement event indicated by the expand gesture ends, that is, the target object ends the group dissolution operation, coordinates (trigger destination positions) of the trigger points at the end of the touch movement event may be obtained, and may be denoted as (x5, y5) and (x6, y6). Further, a distance L2 between the two trigger points at the end of the touch movement event may be calculated based on coordinates (x5, y5) and (x6, y6). For a calculation manner of the distance L2, refer to related descriptions in the embodiment corresponding to FIG. 13. Details are not described herein again. After the gesture starts, when the quantity of fingers in the message list page is less than 2, it may be determined that the expand gesture ends.

Further, the distance L1 may be compared with the distance L2. When the distance L2 is greater than the distance L1, it indicates that the expanding gesture of the current target object is used for dissolving a group. When the distance L2 is less than or equal to the distance L1, no processing may be performed on the group.

If the gesture triggered by the target object is an expand gesture used for dissolving a group, a confirmation pop-up window for determining whether to dissolve a group pops up. When the user chooses to confirm, the group triggered by the target object can be dissolved. For dissolution logic of the group, refer to related descriptions in S204. Details are not described herein again.

In some embodiments, for interaction objects that are displayed on the user interaction page and that are associated with the target object, an object combination operation may be performed on two or more interaction objects on the user interaction page, so that a new target group can be quickly established. In this way, creation operations of the target group can be reduced, thereby improving creation efficiency of the target group. In addition, in a process of creating the target group, group members that join the target group can be effectively controlled, thereby improving management efficiency of the target group. A group dissolution operation can be performed on a group by using an expand gesture, and a group triggered by the target object can be directly dissolved, so that a group dissolution operation can be improved.

It may be understood that, in specific implementations of this application, related data of a user may be involved (for example, account information, a user profile photo, and nickname information of the user in the communication application). When the foregoing embodiments of this application are applied to a specific product or technology, a permission or consent of the user needs to be obtained, and the related data needs to be collected, used, and processed in compliance with relevant laws and standards of a related country or region.

Figure 15:
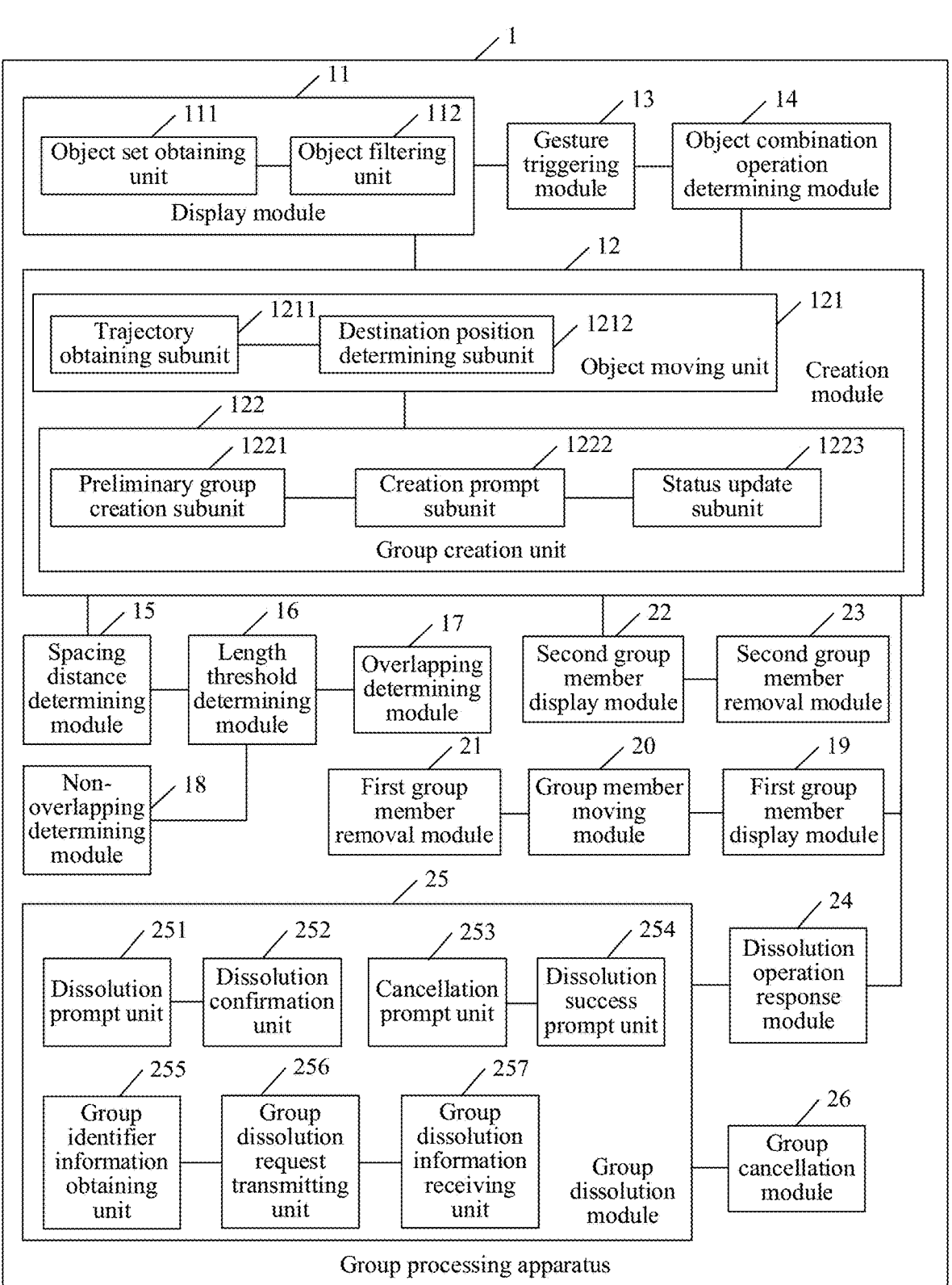
FIG. 15 is a schematic structural diagram of a group processing apparatus according to an embodiment of this application.

FIG. 15 is a schematic structural diagram of a group processing apparatus according to an embodiment of this application. As shown in FIG. 15, the group processing apparatus 1 may include a display module 11 and a creation module 12.

The display module 11 is configured to display a user interaction page associated with a target object, the user interaction page including an interaction object of the target object in a communication application, and the interaction object being displayed in a form of an object identifier on the user interaction page; and the creation module 12 is configured to: create, in response to an object combination operation on the user interaction page, a target group based on M interaction objects triggered by the object combination operation, and display the target group on the user interaction page, M being an integer greater than 1.

For specific function implementations of the display module 11 and the creation module 12, refer to S101 and S102 in the embodiment corresponding to FIG. 3. Details are not described herein again.

In one or more embodiments, the display module 11 may include an object set obtaining unit 111 and an object filtering unit 112.

The object set obtaining unit 111 is configured to obtain object filtering information in the communication application, and obtain, in the communication application, an object set associated with the target object; and the object filtering unit 112 is configured to obtain, from the object set, an interaction object that satisfies the object filtering information, and display a user interaction page that includes the interaction object.

For specific function implementations of the object set obtaining unit 111 and the object filtering unit 112, refer to S101 in the embodiment corresponding to FIG. 3. Details are not described herein again.

In one or more embodiments, the group processing apparatus 1 may further include a gesture triggering module 13 and an object combination operation determining module 14.

The gesture triggering module 13 is configured to: obtain, in response to a gesture trigger operation on the user interaction page, position information of N combination trigger points determined by the gesture trigger operation on the user interaction page, N being a positive integer greater than or equal to M; and the object combination operation determining module 14 is configured to: determine the gesture trigger operation as the object combination operation in a case that position information of M combination trigger points in the N combination trigger points belongs to a region position corresponding to an interaction object on the user interaction page.

For specific function implementations of the gesture triggering module 13 and the object combination operation determining module 14, refer to S102 in the embodiment corresponding to FIG. 3. Details are not described herein again.

In one or more embodiments, the creation module 12 may include an object moving unit 121 and a group creation unit 122.

The object moving unit 121 is configured to move, in response to the object combination operation on the user interaction page, the M interaction objects triggered by the object combination operation on the user interaction page; and the group creation unit 122 is configured to create the target group based on the M interaction objects in a case that the moved M interaction objects overlap.

In one embodiment, the object moving unit 121 is specifically configured to:

determine, in response to the object combination operation on the user interaction page and based on a trajectory corresponding to the object combination operation, the M interaction objects triggered by the object combination operation, and move the M interaction objects to a destination position of the object combination operation on the user interaction page.

For specific function implementations of the object moving unit 121 and the group creation unit 122, refer to S102 in the embodiment corresponding to FIG. 3. Details are not described herein again.

In one or more embodiments, the object moving unit 121 may include a trajectory obtaining subunit 121 and a destination position determining subunit 122.

The trajectory obtaining subunit 121 is configured to: obtain the trajectory corresponding to the object combination operation in response to the object combination operation on the user interaction page, and determine, based on a start position of the trajectory in the user interaction page, the M interaction objects triggered by the object combination operation; and the destination position determining subunit 122 is configured to: determine a position at which the object combination operation ends as a destination position of the trajectory on the user interaction page, and move the M interaction objects to the destination position of the trajectory.

For specific function implementations of the trajectory obtaining subunit 121 and the destination position determining subunit 122, refer to S102 in the embodiment corresponding to FIG. 3. Details are not described herein again.

In one or more embodiments, the M interaction objects include a first interaction object and a second interaction object, the first interaction object includes a first initial position before moving and a first destination position after moving, and the second interaction object includes a second initial position before moving and a second destination position after moving; and the group processing apparatus 1 may further include a spacing distance determining module 15, a length threshold determining module 16, an overlapping determining module 17, and a non-overlapping determining module 18.

The spacing distance determining module 15 is configured to determine an object spacing distance between the first interaction object and the second interaction object according to the first destination position and the second destination position;

the length threshold determining module 16 is configured to determine a destination length threshold on the user interaction page according to a region size corresponding to the first interaction object and a region size corresponding to the second interaction object;

the overlapping determining module 17 is configured to: determine, in a case that the object spacing distance is less than the destination length threshold, that the moved first interaction object overlaps with the moved second interaction object; and the non-overlapping determining module 18 is configured to: determine, in a case that the object spacing distance is greater than or equal to the destination length threshold, that the moved first interaction object does not overlap with the moved second interaction object, return the first interaction object from the first destination position to the first initial position, and return the second interaction object from the second destination position to the second initial position.

For specific function implementations of the spacing distance determining module 15, the length threshold determining module 16, the overlapping determining module 17, and the non-overlapping determining module 18, refer to S102 in the embodiment corresponding to FIG. 3. Details are not described herein again.

In one or more embodiments, the group creation unit 122 may include a preliminary group creation subunit 1221, a creation prompt subunit 1222, and a status update subunit 1223.

The preliminary group creation subunit 1221 is configured to: create a preliminary group based on the M interaction objects in a case that the moved M interaction objects overlap, the preliminary group being displayed to be in a pre-established state;

the creation prompt subunit 1222 is configured to display, on the user interaction page, the preliminary group and creation prompt information associated with the preliminary group; and the status update subunit 1223 is configured to: update the preliminary group from the pre-established state to a creation success state in response to a confirm operation for the creation prompt information, and determine the preliminary group having the creation success state as the target group.

In one embodiment, the preliminary group creation subunit 1221 is specifically configured to:

obtain interaction object information of the M interaction objects in the communication application and target object information of the target object in the communication application in a case that the M moved interaction objects overlap;

transmit, to a service device, a group creation request that carries the interaction object information and the target object information, so that in a case of determining that the interaction object information and the target object information conform to identity validity, the service device creates group data associated with the M interaction objects and the target object; and receive the group data returned by the service device, and create, according to the group data, a preliminary group including the M interaction objects.

For specific function implementations of the preliminary group creation subunit 1221, the creation prompt subunit 1222, and the status update subunit 1223, refer to S102 in the embodiment corresponding to FIG. 3. Details are not described herein again.

In one or more embodiments, the group processing apparatus may further include a first group member display module 19, a group member moving module 20, a first group member removal module 21, a second group member display module 22, and a second group member removal module 23.

The first group member display module 19 is configured to: display a member display page in response to a trigger operation for the preliminary group, and display, in the member display page, group members included in the preliminary group, the group members included in the preliminary group being associated with the M interaction objects;

the group member moving module 20 is configured to: move, in response to a member movement operation in the member display page, a group member triggered by the member movement operation to a member removal region in the member display page; and the first group member removal module 21 is configured to: remove the group member in the member removal region from the preliminary group, and update a quantity of members in the preliminary group displayed on the user interaction page.

The second group member display module 22 is configured to display, in response to a trigger operation for the target group, group members included in the target group, the group members included in the target group being associated with the M interaction objects; and the second group member removal module 23 is configured to: remove, in response to a member removal operation for the target group, a group member determined by the member removal operation from the target group.

For specific function implementations of the first group member display module 19, the group member moving module 20, the first group member removal module 21, the second group member display module 22, and the second group member removal module 23, refer to S102 in the embodiment corresponding to FIG. 3. Details are not described herein again.

In one or more embodiments, the group processing apparatus 1 may further include a dissolution operation response module 24 and a group dissolution module 25.

The dissolution operation response module 24 is configured to: obtain, in response to a group dissolution operation for the target group, trigger initial positions and trigger destination positions of K dissolution trigger points determined by the group dissolution operation in the communication page, K being an integer greater than 1; and the group dissolution module 25 is configured to: dissolve the target group in a case that a distance between the trigger initial positions corresponding to the K dissolution trigger points is less than a distance between the trigger destination positions corresponding to the K dissolution trigger points, and display dissolution success prompt information associated with the target group.

For specific function implementations of the dissolution operation response module 24 and the group dissolution module 25, refer to S203 and S204 in the embodiment corresponding to FIG. 10. Details are not described herein again.

In one or more embodiments, the group dissolution module 25 may include a dissolution prompt unit 251, a dissolution confirmation unit 252, a cancellation prompt unit 253, a dissolution success prompt unit 254, a group identifier information obtaining unit 255, a group dissolution request transmitting unit 256, and a group dissolution information receiving unit 257.

The dissolution prompt unit 251 is configured to: display dissolution prompt information for the target group on the user interaction page in a case that the distance between the trigger initial positions corresponding to the K dissolution trigger points is less than the distance between the trigger destination positions corresponding to the K dissolution trigger points; and the dissolution confirmation unit 252 is configured to: dissolve the target group in response to a confirm operation for the dissolution prompt information, and display the dissolution success prompt information associated with the target group.

The cancellation prompt unit 253 is configured to: dissolve the target group in a case that the distance between the trigger initial positions corresponding to the K dissolution trigger points is less than the distance between the trigger destination positions corresponding to the K dissolution trigger points, and display, on the user interaction page, cancellation prompt information associated with the dissolved target group; and the dissolution success prompt unit 254 is configured to: display the dissolution success prompt information associated with the target group in a case that a cancel operation for the cancellation prompt information is not detected and display duration of the cancellation prompt information on the user interaction page is greater than or equal to a duration threshold.

The group identifier information obtaining unit 255 is configured to: obtain group identifier information corresponding to the target group and target object information corresponding to the target object in a case that the distance between the trigger initial positions corresponding to the K dissolution trigger points is less than the distance between the trigger destination positions corresponding to the K dissolution trigger points;

the group dissolution request transmitting unit 256 is configured to transmit, to a service device, a group dissolution request that carries the group identifier information and the target object information, so that in a case of determining that the target object information conforms to identity validity, the service device generates group dissolution information for group data corresponding to the group identifier information; and the group dissolution information receiving unit 257 is configured to: receive the group dissolution information returned by the service device, dissolve the target group based on the group dissolution information, and display, on the user interaction page, the dissolution success prompt information associated with the target group.

For specific function implementations of the dissolution prompt unit 251, the dissolution confirmation unit 252, the cancellation prompt unit 253, the dissolution success prompt unit 254, the group identifier information obtaining unit 255, the group dissolution request transmitting unit 256, and the group dissolution information receiving unit 257, refer to S204 in the embodiment corresponding to FIG. 10. Details are not described herein again.

In one or more embodiments, the group processing apparatus 1 may further include a group cancellation module 26.

The group cancellation module 26 is configured to: cancel the group dissolution operation for the target group in response to a confirm operation for the cancellation prompt information, and restore the target group.

For specific function implementations of the group cancellation module 26, refer to S204 in the embodiment corresponding to FIG. 10. Details are not described herein again.

In some embodiments, for interaction objects that are displayed on the user interaction page and that are associated with the target object, an object combination operation may be performed on two or more interaction objects on the user interaction page, so that a new target group can be quickly established. In this way, creation operations of the target group can be reduced, thereby improving creation efficiency of the target group. In addition, in a process of creating the target group, group members that join the target group can be effectively controlled, thereby improving management efficiency of the target group. A group dissolution operation can be performed on a group by using an expand gesture, and a group triggered by the target object can be directly dissolved, so that a group dissolution operation can be improved.

Figure 16:
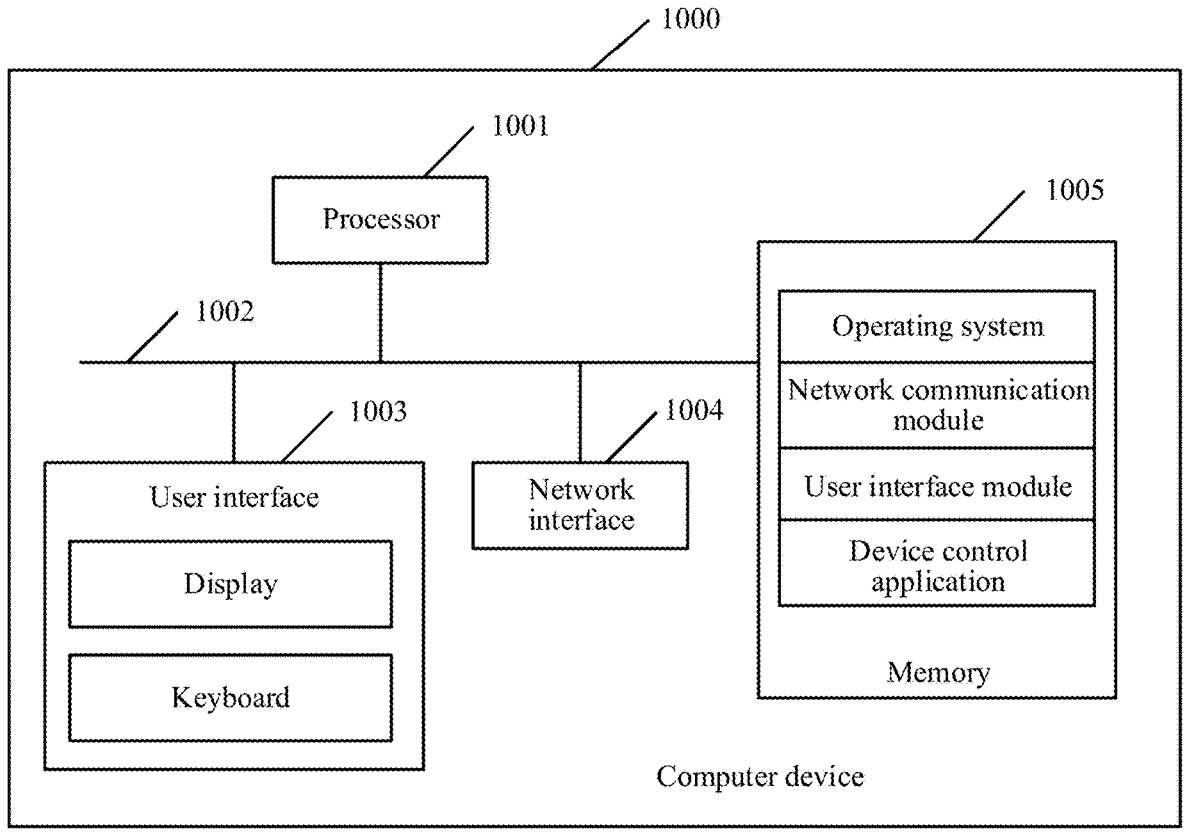
FIG. 16 is a schematic structural diagram of a computer device according to an embodiment of this application.

FIG. 16 is a schematic structural diagram of a computer device according to an embodiment of this application. As shown in FIG. 16, the computer device 1000 may be a user terminal, for example, the user terminal 10a in the embodiment corresponding to FIG. 1, or may be a server, for example, the server 10d in the embodiment corresponding to FIG. 1, which is not limited herein. For ease of understanding, in this application, that the computer device is a user terminal is used as an example, the computer device 1000 may include a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. In one embodiment, the user interface 1003 may further include a standard wired interface and wireless interface. In one embodiment, the network interface 1004 may include a standard wired interface and a standard wireless interface (such as a Wi-Fi interface). Memory 1005 may be a high-speed RAM memory, or may be a non-volatile memory, for example, at least one magnetic disk memory. In one embodiment, the memory 1005 may alternatively be at least one storage apparatus located away from the processor 1001. As shown in FIG. 16, memory 1005 used as a computer readable storage medium may include an operating system, a network communication module, a user interface module, and a device-management application program.

In the computer device 1000 shown in FIG. 16, the network interface 1004 may provide a network communication function. The user interface 1003 is mainly configured to provide an input interface for a user. The processor 1001 may be configured to invoke the device-control application program stored in the memory 1005, to implement the following operations:

displaying a user interaction page associated with a target object, the user interaction page including an interaction object of the target object in a communication application, and the interaction object being displayed in a form of an object identifier on the user interaction page; and creating, in response to an object combination operation on the user interaction page, a target group based on M interaction objects triggered by the object combination operation, and displaying the target group on the user interaction page, M being an integer greater than 1.

It is to be understood that the computer device 1000 described in some embodiments may perform the foregoing description of the group processing method in any one of the embodiments corresponding to FIG. 3 and FIG. 10, or may perform the foregoing description of the group processing apparatus 1 in the embodiment corresponding to FIG. 15. Details are not described herein again. In addition, the description of beneficial effects of the same method is not described herein again.

In addition, an embodiment of this application further provides a computer readable storage medium, and the computer readable storage medium stores a computer program executed by the group processing apparatus 1 mentioned above, and the computer program includes program instructions. When a processor executes the program instructions, descriptions of the group processing method in any one of the embodiments corresponding to FIG. 3 and FIG. 10 can be executed. Therefore, details are not described herein again. In addition, the description of beneficial effects of the same method is not described herein again. For technical details that are not disclosed in the computer readable storage medium embodiments of this application, refer to the descriptions of the method embodiments of this application. As an example, the program instructions may be deployed on one computing device, or executed on multiple computing devices located at one position, or executed on multiple computing devices distributed at multiple positions and interconnected by using a communication network, and a blockchain system can be formed by multiple computing devices distributed at multiple positions and interconnected by using a communication network.

In addition, an embodiment of this application further provides a computer program product. The computer program product may include a computer program, and the computer program may be stored in a computer readable storage medium. A processor of a computer device reads the computer program from the computer readable storage medium, and the processor may execute the computer program, so that the computer device executes the foregoing description of the group processing method in any one of the embodiments corresponding to FIG. 3 to FIG. 10. Therefore, details are not described herein again. In addition, the description of beneficial effects of the same method is not described herein again. For technical details related to the computer program product or the computer program embodiment in this application, refer to the description in the method embodiment of this application.

With regard to the foregoing method embodiments, for the purpose of simple description, the method embodiments are described as combinations of a series of actions, but a person skilled in the art is to learn that this application is not limited by the described order of the actions, as some steps can, in accordance with this application, be performed in other orders or concurrently. In addition, a person skilled in the art also needs to appreciate that all the implementations described in the present specification are examples of implementations, and the mentioned actions and modules are not necessarily mandatory to the present specification.

The steps of the method in the embodiments of this application may be adjusted in terms of sequence, and merged or deleted according to specific requirements.

The modules in the apparatus in the embodiment of this application may be combined, divided, or deleted according to specific requirements.

A person of ordinary skill in the art is to understand that all or a part of the processes of the method in the foregoing embodiment may be implemented by a program instructing relevant hardware. The program may be stored in a computer readable storage medium. When the program is run, the processes of the method in the foregoing embodiment are performed. The foregoing storage medium may include a magnetic disc, an optical disc, a read-only memory (ROM), a random access memory (RAM), or the like.

What is disclosed above are embodiments of this application, and certainly is not intended to limit the scope of the claims of this application. Therefore, equivalent variations made in accordance with the claims of this application shall fall within the scope of this application.

What is claimed is:

1. A group processing method, comprising:

displaying a user interaction page associated with a target object, the user interaction page comprising an interaction object of the target object in a communication application, and the interaction object being displayed in a form of an object identifier on the user interaction page;

creating a target group based on M interaction objects in response to an object combination operation on the user interaction page, and displaying the target group on the user interaction page, M being an integer greater than 1;

obtaining, in response to a group dissolution operation for the target group, trigger initial positions and trigger destination positions of K dissolution trigger points determined by the group dissolution operation in a communication page, K being an integer greater than 1; and dissolving the target group in response to that a distance between the trigger initial positions corresponding to the K dissolution trigger points is less than a distance between the trigger destination positions corresponding to the K dissolution trigger points, and displaying dissolution success prompt information associated with the target group.

2. The method according to claim 1, wherein creating a target group based on M interaction objects in response to an object combination operation on the user interaction page comprises:

moving the M interaction objects in response to the object combination operation on the user interaction page; and creating the target group based on the M interaction objects in a case that the M moved interaction objects overlap.

3. The method according to claim 2, wherein the moving the M interaction objects in response to the object combination operation on the user interaction page comprises:

determining, in response to the object combination operation on the user interaction page and based on a trajectory corresponding to the object combination operation, the M interaction objects triggered by the object combination operation, and moving the M interaction objects to a destination position of the object combination operation on the user interaction page.

4. The method according to claim 3, wherein the determining, in response to the object combination operation on the user interaction page and based on a trajectory corresponding to the object combination operation, the M interaction objects triggered by the object combination operation, and moving the M interaction objects to a destination position of the object combination operation on the user interaction page comprises:

obtaining the trajectory corresponding to the object combination operation in response to the object combination operation on the user interaction page, and determining, based on a start position of the trajectory in the user interaction page, the M interaction objects triggered by the object combination operation; and determining a position at which the object combination operation ends as a destination position of the trajectory on the user interaction page, and moving the M interaction objects to the destination position of the trajectory.

5. The method according to claim 3, wherein the M interaction objects comprise a first interaction object and a second interaction object, the first interaction object comprises a first initial position before moving and a first destination position after moving, and the second interaction object comprises a second initial position before moving and a second destination position after moving; and the method further comprises:

determining an object spacing distance between the first interaction object and the second interaction object according to the first destination position and the second destination position;

determining a destination length threshold on the user interaction page according to a region size corresponding to the first interaction object and a region size corresponding to the second interaction object; and determining, in a case that the object spacing distance is less than the destination length threshold, that the moved first interaction object overlaps with the moved second interaction object; or determining, in a case that the object spacing distance is greater than or equal to the destination length threshold, that the moved first interaction object does not overlap with the moved second interaction object, returning the first interaction object from the first destination position to the first initial position, and returning the second interaction object from the second destination position to the second initial position.

6. The method according to claim 2, wherein the creating the target group based on the M interaction objects in a case that the M moved interaction objects overlap comprises:

creating a preliminary group based on the M interaction objects in a case that the M moved interaction objects overlap, the preliminary group being displayed to be in a pre-established state;

displaying, on the user interaction page, the preliminary group and creation prompt information associated with the preliminary group; and updating the preliminary group from the pre-established state to a creation success state in response to a confirm operation for the creation prompt information, and determining the preliminary group having the creation success state as the target group.

7. The method according to claim 6, wherein the creating a preliminary group based on the M interaction objects in a case that the M moved interaction objects overlap comprises:

obtaining interaction object information of the M interaction objects in the communication application and target object information of the target object in the communication application in a case that the M moved interaction objects overlap;

transmitting, to a service device, a group creation request that carries the interaction object information and the target object information, in a case of determining that the interaction object information and the target object information conform to identity validity, the service device creating group data associated with the M interaction objects and the target object; and receiving the group data returned by the service device, and creating, according to the group data, a preliminary group comprising the M interaction objects.

8. The method according to claim 6, further comprising:

displaying a member display page in response to a trigger operation for the preliminary group, and displaying, in the member display page, group members in the preliminary group, the group members comprised in the preliminary group being associated with the M interaction objects;

moving, in response to a member movement operation in the member display page, a group member triggered by the member movement operation to a member removal region in the member display page; and removing the group member in the member removal region from the preliminary group, and updating a quantity of members in the preliminary group.

9. The method according to claim 1, further comprising:

displaying, in response to a trigger operation for the target group, group members in the target group, the group members in the target group being associated with the M interaction objects; and removing, in response to a member removal operation for the target group, a group member determined by the member removal operation from the target group.

10. The method according to claim 1, wherein the displaying a user interaction page associated with a target object comprises:

obtaining object filtering information in the communication application, and obtaining, in the communication application, an object set associated with the target object; and obtaining, from the object set, an interaction object that satisfies the object filtering information, and displaying a user interaction page that comprises the interaction object.

11. The method according to claim 1, further comprising:

obtaining, in response to a gesture trigger operation on the user interaction page, position information of N combination trigger points determined by the gesture trigger operation on the user interaction page, N being a positive integer greater than or equal to M; and determining the gesture trigger operation as the object combination operation in a case that position information of M combination trigger points in the N combination trigger points belongs to a region position corresponding to an interaction object on the user interaction page.

12. The method according to claim 1, wherein the dissolving the target group, and displaying dissolution success prompt information associated with the target group comprises:

displaying dissolution prompt information for the target group on the user interaction page in a case that the distance between the trigger initial positions corresponding to the K dissolution trigger points is less than the distance between the trigger destination positions corresponding to the K dissolution trigger points; and dissolving the target group in response to a confirm operation for the dissolution prompt information, and displaying the dissolution success prompt information associated with the target group.

13. The method according to claim 1, wherein the dissolving the target group, and displaying dissolution success prompt information associated with the target group comprises:

dissolving the target group in a case that the distance between the trigger initial positions corresponding to the K dissolution trigger points is less than the distance between the trigger destination positions corresponding to the K dissolution trigger points, and displaying, on the user interaction page, cancellation prompt information associated with the dissolved target group; and displaying the dissolution success prompt information associated with the target group in a case that a cancel operation for the cancellation prompt information is not detected and display duration of the cancellation prompt information on the user interaction page is greater than or equal to a duration threshold.

14. The method according to claim 13, further comprising:

canceling the group dissolution operation for the target group in response to a confirm operation for the cancellation prompt information, and restoring the target group.

15. The method according to claim 1, wherein the dissolving the target group, and displaying dissolution success prompt information associated with the target group comprises:

obtaining group identifier information corresponding to the target group and target object information corresponding to the target object in a case that the distance between the trigger initial positions corresponding to the K dissolution trigger points is less than the distance between the trigger destination positions corresponding to the K dissolution trigger points;

transmitting, to a service device, a group dissolution request that carries the group identifier information and the target object information, in a case of determining that the target object information conforms to identity validity, the service device generating group dissolution information for group data corresponding to the group identifier information; and receiving the group dissolution information returned by the service device, dissolving the target group based on the group dissolution information, and displaying, on the user interaction page, the dissolution success prompt information associated with the target group.

16. A computer device, comprising a memory and a processor;

the memory being connected to the processor, the memory being configured to store a computer program, and the processor being configured to invoke the computer program, so that the computer device performs:

displaying a user interaction page associated with a target object, the user interaction page comprising an interaction object of the target object in a communication application, and the interaction object being displayed in a form of an object identifier on the user interaction page;

creating a target group based on M interaction objects in response to an object combination operation on the user interaction page, and displaying the target group on the user interaction page, M being an integer greater than 1;

obtaining, in response to a group dissolution operation for the target group, trigger initial positions and trigger destination positions of K dissolution trigger points determined by the group dissolution operation in a communication page, K being an integer greater than 1; and dissolving the target group in response to that a distance between the trigger initial positions corresponding to the K dissolution trigger points is less than a distance between the trigger destination positions corresponding to the K dissolution trigger points, and displaying dissolution success prompt information associated with the target group.

17. The computer device according to claim 16, wherein creating a target group based on M interaction objects in response to an object combination operation on the user interaction page comprises:

moving the M interaction objects in response to the object combination operation on the user interaction page; and creating the target group based on the M interaction objects in a case that the M moved interaction objects overlap.

18. The computer device according to claim 17, wherein the moving the M interaction objects in response to the object combination operation on the user interaction page comprises:

determining, in response to the object combination operation on the user interaction page and based on a trajectory corresponding to the object combination operation, the M interaction objects triggered by the object combination operation, and moving the M interaction objects to a destination position of the object combination operation on the user interaction page.

19. A non-transitory computer readable storage medium, the computer readable storage medium storing a computer program, and the computer program being loaded and executed by a processor, so that a computer device having the processor performs:

displaying a user interaction page associated with a target object, the user interaction page comprising an interaction object of the target object in a communication application, and the interaction object being displayed in a form of an object identifier on the user interaction page;

creating a target group based on M interaction objects in response to an object combination operation on the user interaction page, and displaying the target group on the user interaction page, M being an integer greater than 1;

obtaining, in response to a group dissolution operation for the target group, trigger initial positions and trigger destination positions of K dissolution trigger points determined by the group dissolution operation in a communication page, K being an integer greater than 1; and dissolving the target group in response to that a distance between the trigger initial positions corresponding to the K dissolution trigger points is less than a distance between the trigger destination positions corresponding to the K dissolution trigger points, and displaying dissolution success prompt information associated with the target group.

* * * * *